US011216556B2

(12) United States Patent
Grewal et al.

(10) Patent No.: US 11,216,556 B2
(45) Date of Patent: Jan. 4, 2022

(54) SIDE CHANNEL ATTACK PREVENTION BY MAINTAINING ARCHITECTURAL STATE CONSISTENCY

(71) Applicant: Intel Corporation, Santa Clara, CA (US)

(72) Inventors: Ken Grewal, Hillsboro, OR (US); Ravi Sahita, Portland, OR (US); David Durham, Beaverton, OR (US); Erdem Aktas, Beaverton, OR (US); Sergej Deutsch, Hillsboro, OR (US); Abhishek Basak, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 483 days.

(21) Appl. No.: 16/222,785

(22) Filed: Dec. 17, 2018

(65) Prior Publication Data

US 2019/0138720 A1    May 9, 2019

(51) Int. Cl.
*G08B 23/00* (2006.01)
*G06F 12/16* (2006.01)
(Continued)

(52) U.S. Cl.
CPC .......... *G06F 21/556* (2013.01); *G06F 9/3842* (2013.01); *G06F 12/0891* (2013.01);
(Continued)

(58) Field of Classification Search
CPC .. G06F 21/556; G06F 9/3842; G06F 12/0891; G06F 12/14; G06F 2212/1052; G06F 2221/034
(Continued)

(56) References Cited

U.S. PATENT DOCUMENTS 5,838,988 A * 11/1998 Panwar ................. G06F 9/3861
712/32
6,330,668 B1 * 12/2001 Curiger .............. G05B 19/0428
713/1
(Continued)

OTHER PUBLICATIONS

Daniel Genkin; May the Fourth Be With You: A Microarchitectural Side Channel Attack on Several Real-World Applications of Curve25519; ACM; 2017; pp. 845-858.*

(Continued)

*Primary Examiner* — Monjur Rahim
(74) *Attorney, Agent, or Firm* — Alliance IP, LLC

(57) ABSTRACT

The present disclosure is directed to systems and methods that maintain consistency between a system architectural state and a microarchitectural state in the system cache circuitry to prevent a side-channel attack from accessing secret information. Speculative execution of one or more instructions by the processor circuitry causes memory management circuitry to transition the cache circuitry from a first microarchitectural state to a second microarchitectural state. The memory management circuitry maintains the cache circuitry in the second microarchitectural state in response to a successful completion and/or retirement of the speculatively executed instruction. The memory management circuitry reverts the cache circuitry from the second microarchitectural state to the first microarchitectural state in response to an unsuccessful completion, flushing, and/or retirement of the speculatively executed instruction.

29 Claims, 11 Drawing Sheets

(51) Int. Cl.
*G06F 12/14* (2006.01)
*G06F 11/00* (2006.01)
*G06F 21/55* (2013.01)
*G06F 9/38* (2018.01)
*G06F 12/0891* (2016.01)

(52) U.S. Cl.
CPC ............ *G06F 12/14* (2013.01); *G06F 21/554* (2013.01); *G06F 2212/1052* (2013.01); *G06F 2221/034* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 2006/0259789 A1* | 11/2006 | Ekberg | ................ | G06F 12/1458 713/194 |
| 2008/0307240 A1* | 12/2008 | Dahan | ................... | G06F 1/3203 713/320 |
| 2009/0138772 A1* | 5/2009 | Bertacco | ............. | G06F 11/2236 714/733 |
| 2009/0327664 A1* | 12/2009 | Yoshimi | ................ | G06F 21/755 712/221 |
| 2012/0005515 A1* | 1/2012 | Reddi | ....................... | G06F 1/28 713/340 |
| 2012/0011351 A1* | 1/2012 | Mundra | ................ | H04L 9/3239 713/1 |
| 2012/0331309 A1* | 12/2012 | Scott | ..................... | G06F 21/755 713/194 |
| 2013/0151842 A1* | 6/2013 | Yu | ......................... | G06F 21/755 713/150 |
| 2014/0380071 A1* | 12/2014 | Lee | ........................ | G06F 9/5094 713/321 |
| 2015/0121052 A1* | 4/2015 | Emma | ................... | G06F 11/348 713/1 |
| 2015/0185816 A1* | 7/2015 | Petrica | .................. | G06F 1/3287 713/324 |
| 2015/0378898 A1* | 12/2015 | Busaba | ............... | G06F 12/0808 711/130 |
| 2016/0275288 A1* | 9/2016 | Sethumadhavan | ... | G06F 21/566 |
| 2016/0275289 A1* | 9/2016 | Sethumadhavan | ..... | G06F 21/52 |
| 2018/0268142 A1* | 9/2018 | Sethumadhavan | ..... | G06F 21/52 |
| 2019/0004961 A1* | 1/2019 | Boggs | ..................... | G06F 12/14 |
| 2019/0163902 A1* | 5/2019 | Reid | ...................... | G06F 9/3851 |
| 2019/0332379 A1* | 10/2019 | Calhoun | ............... | G06F 9/3802 |
| 2019/0332384 A1* | 10/2019 | Calhoun | ............ | G06F 12/1425 |
| 2019/0361707 A1* | 11/2019 | Vougioukas | ........ | G06F 9/30145 |
| 2020/0026665 A1* | 1/2020 | Sethumadhavan | ... | G06F 12/084 |

OTHER PUBLICATIONS

Kocher, Paul, et al., Spectre Attacks: Exploiting Speculative Execution, 40th IEEE Symposium on Security and Privacy (S&P'19)2018, 19 pages.

Lipp, Moritz et al., Meltdown, 27th {USENIX} Security Symposium ({USENIX} Security 18), 2018, 16 pages.

* cited by examiner

SIDE CHANNEL ATTACK PREVENTION BY MAINTAINING ARCHITECTURAL STATE CONSISTENCY

TECHNICAL FIELD

The present disclosure relates to computer security, specifically detection and/or prevention of side-channel attacks.

BACKGROUND

Side-channel attacks gained widespread notoriety in early 2018. A side-channel attack includes any attack based on information gained from the implementation of a computer system, rather than weaknesses in the implemented algorithm itself. Such side-channel attacks may use timing information, power consumption, electromagnetic leaks or even sound as an extra source of information, that is exploited to obtain information and/or data from the system. Side-channel attacks include Spectre and Meltdown, both of which rely on deducing whether data originates in a cached or un-cached location. To a significant degree, the determination of where data originates relies upon the precise timing of events such as loads from memory space.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
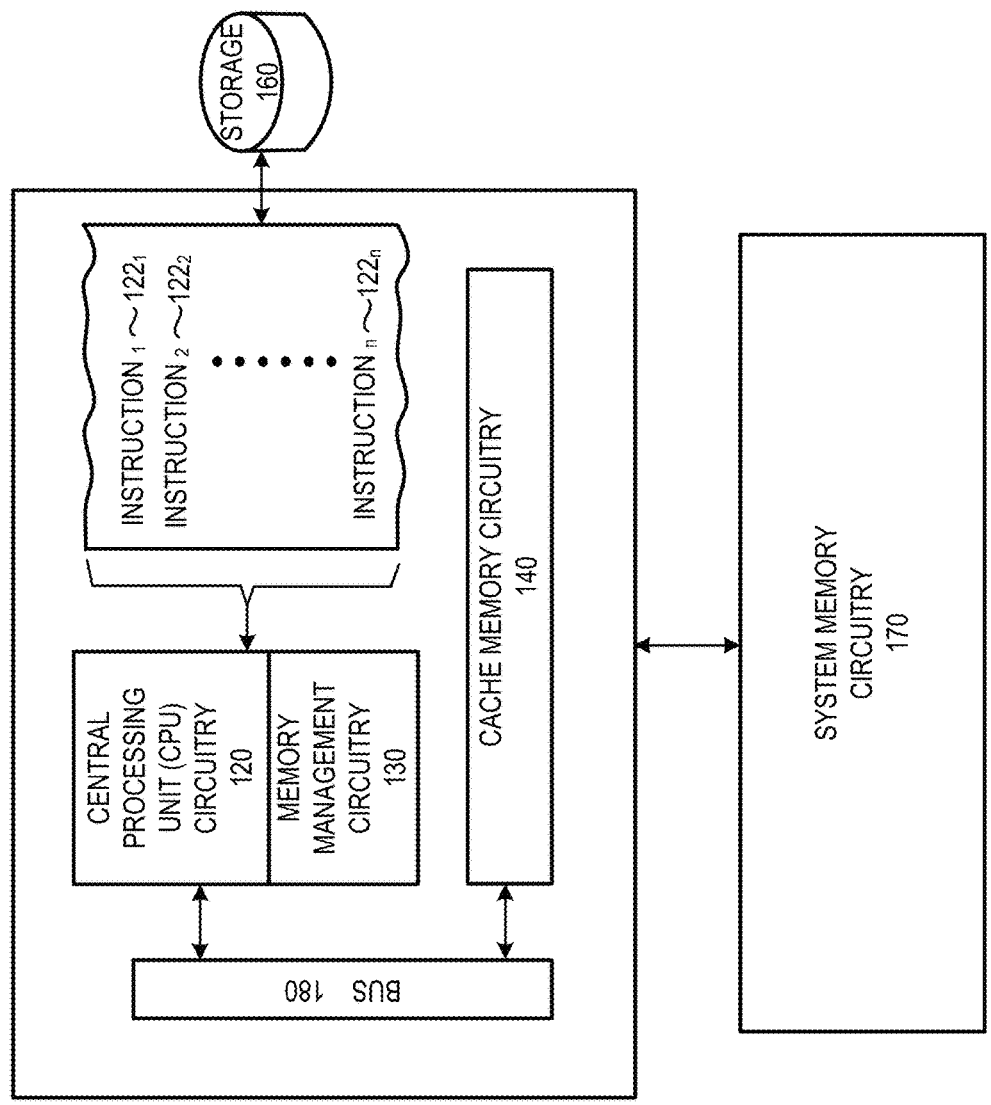
FIG. 1 provides a high-level block diagram of an illustrative system that includes a central processing unit (CPU) having processor circuitry, memory management circuitry, and cache circuitry in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

Speculative execution beneficially increases the speed of a system by allowing the processor to execute instructions independent of data and/or input/output (I/O) access. With speculative execution, a high percentage of the executed instructions will be needed by an application executed by the processor. The speculative execution of an instruction may cause a change in the microarchitectural state of processor cache (e.g., a change in a cache line caused by a transfer of data from system memory to cache memory circuitry). If the speculatively executed instruction is retired/successfully completes, the system architectural state (successful execution of instruction) remains consistent with the microarchitectural state of the processor cache (data loaded into cache based on successful speculative execution). On the other hand, if the speculatively executed instruction fails to complete (e.g., the kernel throws an exception), the system architectural state (unsuccessful execution of instruction) is inconsistent with the microarchitectural state of the processor cache (data loaded into cache based on unsuccessful speculative execution). It is this inconsistency between system architectural state and microarchitectural state that provides the avenue for malicious access by an attacker to cache data using a side-channel attack.

The systems and methods disclosed herein beneficially and advantageously maintain consistency between the microarchitectural state of the processor cache and the system architectural state. Beneficially, data speculatively loaded in to processor cache is retained or discarded based upon the ultimate disposition of a speculatively executed instruction. In the event of an unretired speculatively executed instruction, the systems and methods described herein either maintain or restore the data evicted from the processor cache such that the processor cache microarchitecture remains unchanged and maintains consistency with the system architectural state.

In embodiments, data is loaded from system memory to processor cache as a result of a speculatively executed instruction and the cache line evicted is retained until the speculatively executed instruction is retired. If the speculatively executed instruction remains unretired, the data loaded as a result of the speculatively executed instruction is replaced with the original, stored, cache line. Thus, the systems and methods described herein beneficially maintain consistency between the processor cache microarchitectural state and the system architectural state.

In embodiments, at least one cache line in processor cache is maintained in an open state. Data transferred as a result of a speculatively executed instruction is loaded into the open cache line. Upon retirement of the speculatively executed instruction, a processor cache line is evicted based on system cache eviction policy to provide the "open" cache line. If the speculatively executed instruction remains unretired, the cache data load caused by the speculatively executed instruction is evicted to provide the "open" cache line. Beneficially, the microarchitectural state of the processor cache maintains consistency with the system architectural state, eliminating an attacker's ability to access cache data via a side-channel attack.

A system for protecting against side-channel attacks is provided. The system may include: processor circuitry; cache circuitry coupled to the processor circuitry; memory management circuitry coupled to the processor cache; a storage device containing machine-readable instructions that, when executed, cause the memory management circuitry to: cause a transition the cache circuitry from a first microarchitectural state to a second microarchitectural state responsive to speculative execution of a first instruction by the processor circuitry; maintain the cache circuitry in the second microarchitectural state responsive to a successful speculative execution of the first instruction by the processor circuitry; and cause the cache circuitry to revert from the second microarchitectural state to the first microarchitectural state responsive to an unsuccessful speculative execution of the first instruction by the processor circuitry.

A non-transitory, machine-readable, storage device is provided. The storage device includes instructions that, when executed by memory management circuitry, cause the memory management circuitry to: cause a transition of cache circuitry from a first microarchitectural state to a second microarchitectural state responsive to speculative execution of a first instruction by processor circuitry; maintain the cache circuitry in the second microarchitectural state responsive to a successful speculative execution of the first instruction by the processor circuitry; and cause the cache circuitry to revert from the second microarchitectural state to the first microarchitectural state responsive to an unsuccessful speculative execution of the first instruction by the processor circuitry.

A method for protecting against side-channel attacks is provided. The method may include: causing, by memory management circuitry, a transition of cache circuitry from a first microarchitectural state to a second microarchitectural state responsive to speculative execution of a first instruction by processor circuitry; maintaining, by the memory management circuitry, the cache circuitry in the second microarchitectural state responsive to a successful speculative execution of the first instruction by the processor circuitry; and causing, by memory management circuitry, a reversion of the cache circuitry from the second microarchitectural state to the first microarchitectural state responsive to an unsuccessful speculative execution of the first instruction by the processor circuitry.

Another system for protecting against side-channel attacks is provided. The system may include: means for causing transitioning cache circuitry from a first microarchitectural state to a second microarchitectural state responsive to speculative execution of a first instruction by processor circuitry; means for maintaining the cache circuitry in the second microarchitectural state responsive to a successful speculative execution of the first instruction by the processor circuitry; and means for reverting the cache circuitry from the second microarchitectural state to the first microarchitectural state responsive to an unsuccessful speculative execution of the first instruction by the processor circuitry.

As used herein, the term "processor cache" and "cache circuitry" refer to cache memory present within a processor or central processing unit (CPU) package. Such processor cache may variously be referred to, and should be considered to include, without limitation, Level 1 (L1) cache, Level 2 (L2) cache, Level 3 (L3) cache, and/or last or lowest level cache (LLC).

FIG. 1 provides a high-level block diagram of an illustrative system 100 that includes a central processing unit (CPU) 110 having processor circuitry 120, memory management circuitry 130, and cache circuitry 140 in accordance with at least one embodiment described herein. The system 100 also includes a storage device 160 and system memory circuitry 170 coupled to the CPU 110. In embodiments, a data transfer structure 180, such as a bus may communicably couple the processor circuitry 120, memory management circuitry 130, and cache circuitry 140. The processor circuitry 120 executes a sequence of instructions 122A-122n (collectively, "instructions 122").

In some instances, the processor circuitry 120 may execute a first instruction 122A and may speculatively execute one or more instructions 122B-122n while the first instruction 122A resolves. In such instances, the speculatively executed instructions may cause one or more data transfer operations from main system memory 170 to the cache circuitry 140 in the CPU 110 during the pendency of the first instruction 122A. If the first instruction 122A is retired after successful execution, the data transferred to the cache circuitry 140 by the speculatively executed instructions 122B-122n provides a system performance advantage by beneficially speeding the execution of the instruction set. If, however, the first instruction 122A is not-retired due to an unsuccessful execution (e.g., causing an exception by performing a prohibited action), although not accessed by the application, the retrieved data remains in the cache circuitry 140. In such instances, a side-channel attack, may infer information about the data transferred to the cache circuitry 140 even though the data remains unused until ultimately flushed from the cache circuitry 140. It is the presence of this unused, vestigial, data in the cache circuitry 140 that creates the vulnerability to a side-channel attack. The systems and methods disclosed herein not only evict such vestigial data from the cache circuitry 140, but also restore the microarchitectural state of the cache circuitry 140 to the state prior to the data load caused by the speculatively executed instruction.

In embodiments, the transfer of data from system memory circuitry 170 to the cache circuitry 140 causes a transition of the cache circuitry 140 from a first microarchitectural state to a second architectural state. Where the transfer of data is caused by speculative execution of one or more instructions, the memory management circuitry 130 causes the reversion of the cache circuitry 140 to the first microarchitectural state in response to an unsuccessfully completed and/or unretired speculatively executed instruction. Where the speculatively executed instruction is successfully completed and/or retired, the memory management circuitry 130 permits the cache circuitry 140 to remain in the second microarchitectural state. Beneficially, the memory management circuitry 130 maintains the microarchitectural state of the cache circuitry consistent with the architectural state of the system 100. Advantageously, since the cache circuitry 140 is maintained in a microarchitectural state that is consistent with the system architectural state, a side-channel timing attack such as a Spectre or Meltdown attack, is unable to infer information about the data by examining a side-channel such as CPU cache timing data.

The processor circuitry 120 may include any number and/or combination of electrical components, semiconductor devices, and/or logic elements capable of reading and executing machine-readable instruction sets. In embodiments, the processor circuitry 120 may include any number and/or combination of any currently available and/or future developed processors, microprocessors, controllers, and similar. In embodiments, the processor circuitry 120 may include circuitry capable of performing one or more of: fetching instructions 122, decoding the instructions 122, scheduling the instructions for execution, and executing some instructions while speculatively executing other instructions. In embodiments, the processor circuitry 120 may include one or more single- or multi-thread cores. Example processor circuitry may include microprocessors such as Intel Pentium® microprocessor, Intel Core™ Duo processor, Intel Core i3, Intel Core i5, Intel Core i7, AMD Athlon™ processor, AMD Turion™ processor, AMD Sempron™, AMD Ryzen® processor, and ARM Cortex® processors.

The memory management circuitry 130 may be incorporated into the processor circuitry 120 or may be a stand-alone component. The memory management circuitry 130 monitors and/or controls all or a portion of the memory access, data transfer, and/or data transactions between the cache circuitry 140 and system memory 170. In embodiments, the memory management circuitry 130 may include any number and/or combination of electrical components, semiconductor devices, and/or logic elements capable of reading and executing machine-readable instruction sets. In embodiments, the memory management circuitry 130 may include one or more data stores, databases, and/or data structures useful in mapping virtual memory addresses to physical memory addresses (e.g., a translation lookaside buffer, page tables, or similar).

The cache circuitry 140 may include any number and/or combination of electrical components, semiconductor devices, and/or logic elements capable of non-persistently storing digital information and/or data. In embodiments, all or a portion of the cache circuitry 140 may be communicably coupled to a single processor circuit 120. In other embodiments, all or a portion of the cache circuitry 140 may be shared between multiple processor circuits 120A-120n. In embodiments, the cache circuitry 140 may store information and/or data as a cache line, such as 64 bytes.

The storage device 160 may include any number and/or combination of currently available and/or future developed electrical components, semiconductor devices, and/or logic elements capable of storing machine-readable instructions that cause the memory management circuitry 130 to maintain consistency between the microarchitectural state of the cache circuitry 140 and the architectural state of the system 100. In at least one embodiment, the storage device 160 may include machine-readable instructions that cause the memory management circuitry 130 to maintain consistency between the microarchitectural and architectural states by storing the contents of a cache line prior to transferring data from the system memory circuitry 170 to the cache circuitry 140 responsive to the speculative execution of an instruction. If the speculatively executed instruction completes successfully and/or is retired, the memory management circuitry 130 maintains the cache circuitry 140 in the current state. Conversely, if the speculatively executed instruction does not complete successfully and/or is unretired, the memory management circuitry 130 evicts the data loaded by the speculatively executed instruction and restores the stored data previously held in the cache line. Thus, the microarchitectural state of the cache circuitry 140 is maintained consistent with the system architectural state.

In other embodiments, the storage device 160 may include machine-readable instructions that cause the memory management circuitry 130 to maintain consistency between the microarchitectural and architectural states by maintaining at least one line in the cache circuitry 140 in an "OPEN" state. The memory management circuitry 130 causes the storage of data transferred from the system memory circuitry 170 to the cache circuitry 140 by a speculatively executed instruction in the "OPEN" cache line. If the speculatively executed instruction completes successfully and/or is retired, the memory management circuitry 130 maintains the cache circuitry 140 in the current state. Conversely, if the speculatively executed instruction does not complete successfully and/or remains unretired, the memory management circuitry 130 evicts the data loaded by the speculatively executed instruction and restores the "OPEN" cache line.

Figure 2A:
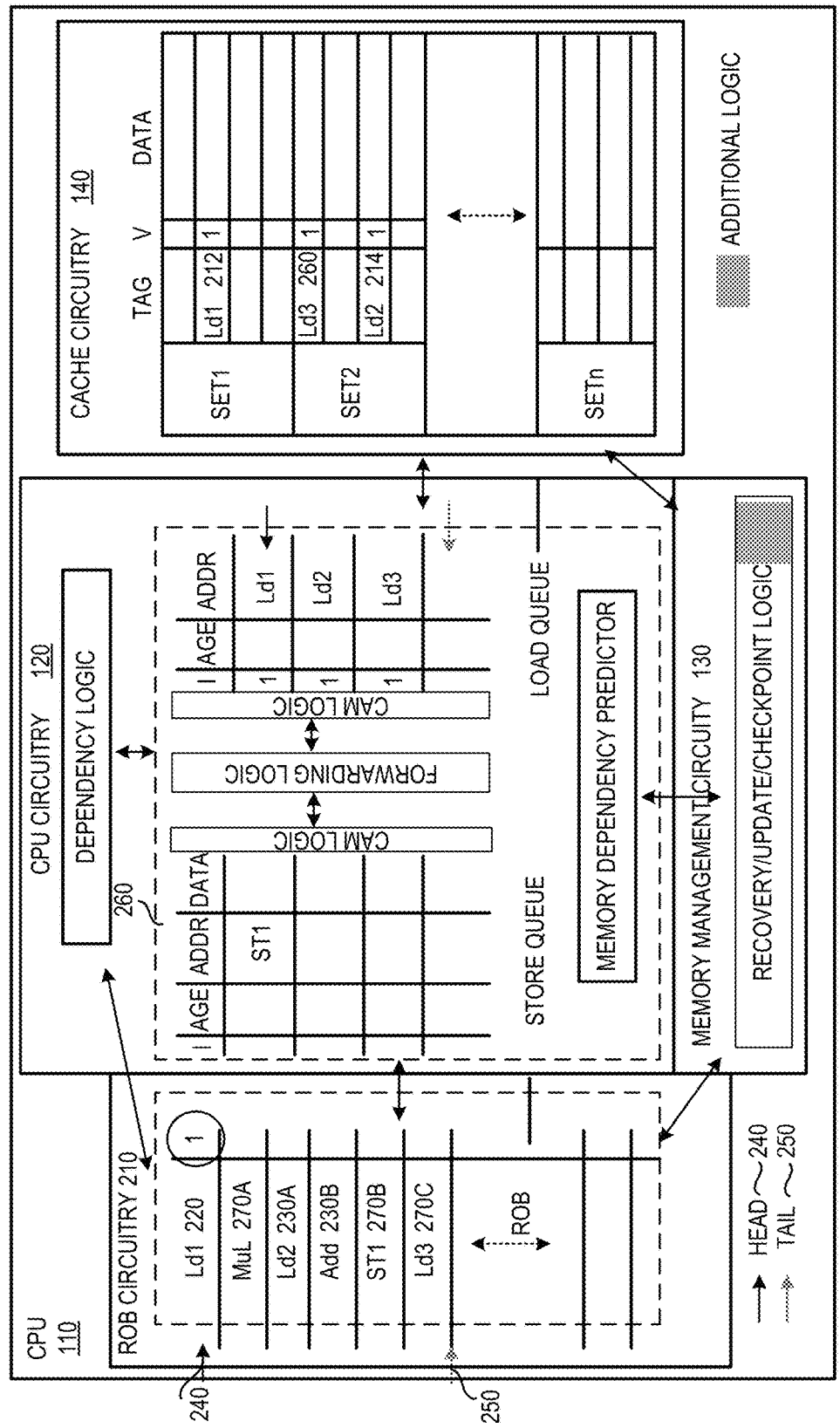
FIG. 2A is a schematic diagram of an illustrative system depicting a flush and reload type side-channel attack using out of order execution across protection domains and prior to execution of a load instruction associated with a malicious side-channel attack, in accordance with at least one embodiment described herein.
Figure 2B:
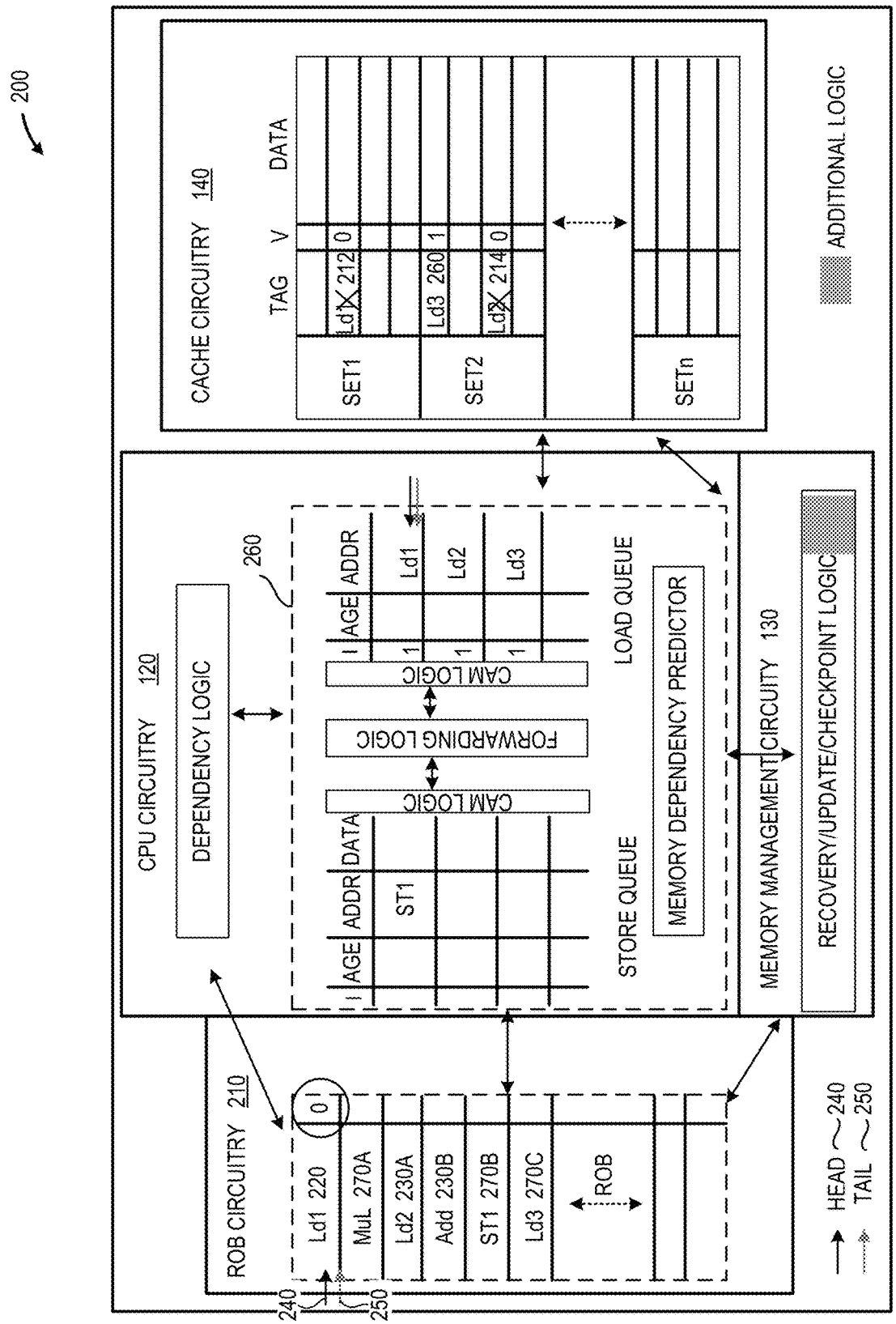
FIG. 2B is a schematic diagram of the illustrative system depicted in FIG. 2A after the invalidation of the load instruction and all dependent load instructions and adjustment of the queue head pointer and tail pointer, in accordance with at least one embodiment described herein.

FIG. 2A is a schematic diagram of an illustrative system 200 depicting a flush and reload type side-channel attack using out of order execution across protection domains and prior to execution of a load instruction 220 associated with a malicious side-channel attack, in accordance with at least one embodiment described herein. FIG. 2B is a schematic diagram of the illustrative system 200 after the invalidation of the load instruction 220 and all dependent load instructions and adjustment of the queue head pointer 240 and tail pointer 250, in accordance with at least one embodiment described herein.

The CPU 110 includes re-order buffer (ROB) circuitry 210, load-store queue circuitry 260, memory management circuitry 130, and cache circuitry 140. As depicted in FIG. 2A, the ROB head pointer 240 indicates the retirement of the malicious first LOAD instruction ("Ld1") 220. The second LOAD instruction ("Ld2") 230A depends upon the first LOAD instruction ("Ld1") 220, for example the first LOAD instruction ("Ld1") 220 may include a speculative load instruction that crosses protection domains and the second LOAD instruction ("Ld2") 230A and add instruction 230B depend upon the value returned by the first load instruction ("Ld1") 220.

During a side-channel attack, the second LOAD instruction ("Ld2") 230A may represent a kernel data indexed array look up. Such a look-up operation provides the main tool to the attacker for subsequent measurement architecturally. As depicted in FIG. 2B, the MULTIPLY ("MuL") instruction 270A, the STORE instruction ("ST1") 270B, and the third LOAD instruction ("Ld3") 270C are not dependent on the first load instruction ("Ld1") 220. The entries in the load-store queue circuitry 260 depict the operations associated with the instruction sequence depicted in the ROB circuitry 210 depicted in FIG. 2A. The load status with respect to the cache circuitry 140 caused by the speculative execution of one or more instructions are shown in the load queue circuitry portion of the load-store queue circuitry 260. As depicted in FIG. 2A, the first LOAD instruction ("Ld1") 220, the second LOAD instruction ("Ld2") 230A, and the third LOAD instruction ("Ld3") 270C execute and the respective loads and/or data transfers to cache circuitry 140 are completed.

FIG. 2B depicts the invalidation of the first LOAD instruction ("Ld1") 220 and all dependent loads along with adjustment of the first queue pointer 240 and second queue pointer 250. The invalidation propagates to all levels of the cache circuitry 140 as the presence of any of the originally flushed array entries in any levels of the cache circuitry 140 may lead to leakage of secret data. In response to the exception generated by the first LOAD instruction ("Ld1") 220, the malicious speculative load ("Ld1") 212 and all subsequent loads ("Ld2") 214 that depend upon the first LOAD instruction ("Ld1") 220 are invalidated in the cache circuitry 140 along with one or more pipeline flushing operations. Thus, upon detection of the exception consumption at original load retirement, all the corresponding load addresses are communicated to the cache circuitry 140 for invalidation.

Figure 3A:
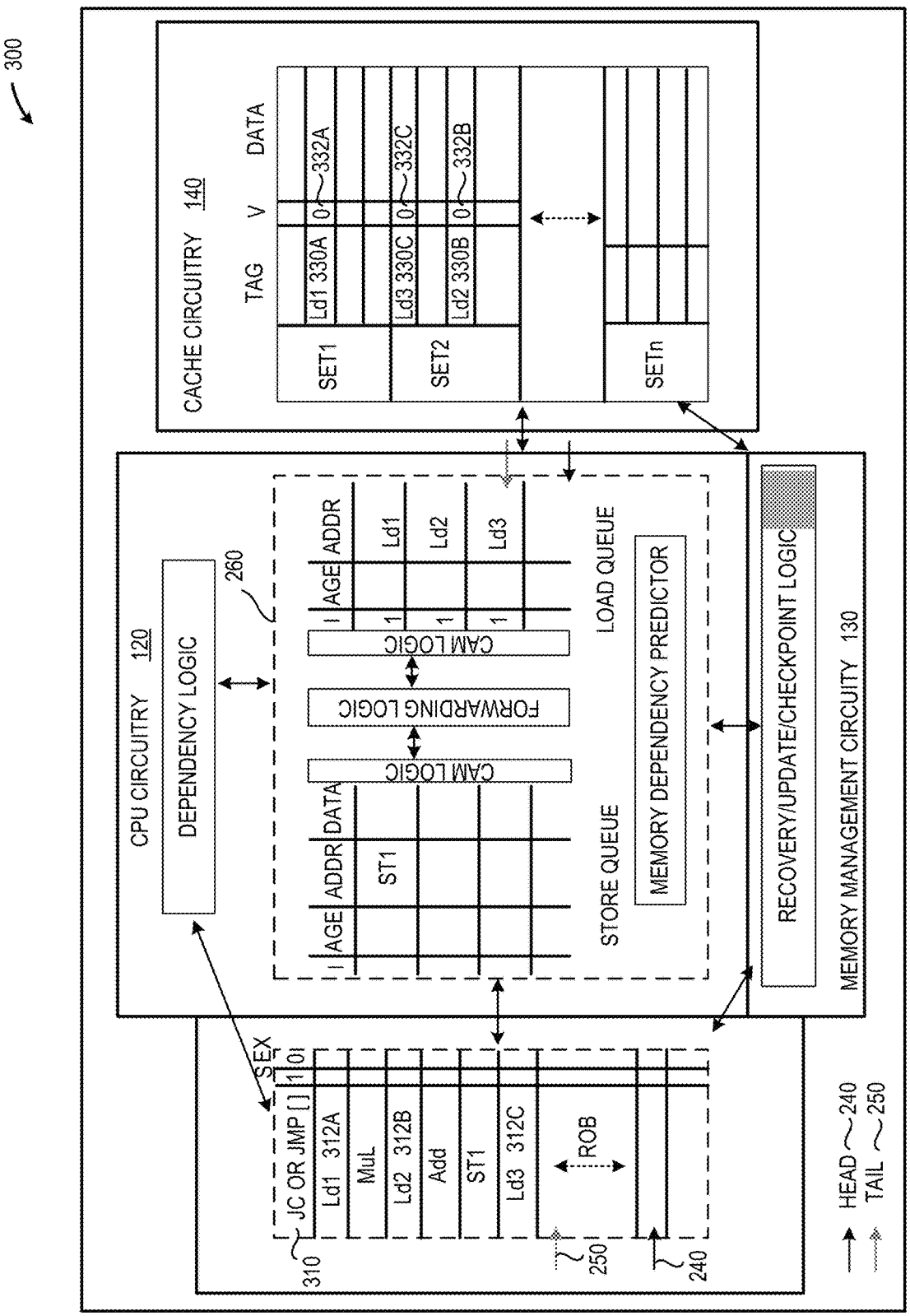
FIG. 3A is a schematic diagram of an illustrative system upon detection of a branch mis-prediction type side channel attack, in accordance with at least one embodiment described herein.
Figure 3B:
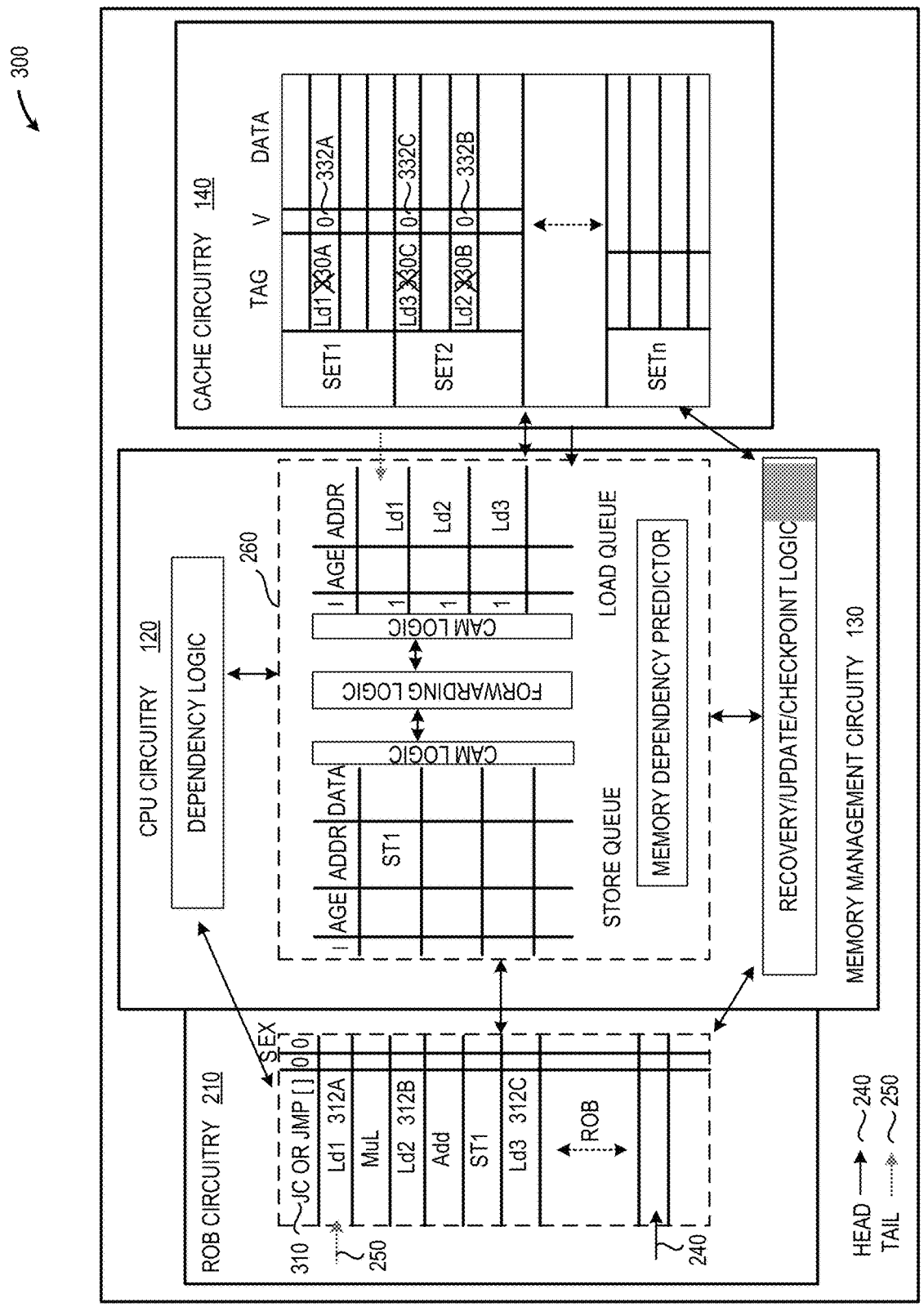
FIG. 3B is a schematic diagram of the illustrative system depicted in FIG. 3A with all of the speculative loads in the branch path invalidated in response to detecting the branch mis-prediction type side channel attack, in accordance with at least one embodiment described herein.
Figure 3C:
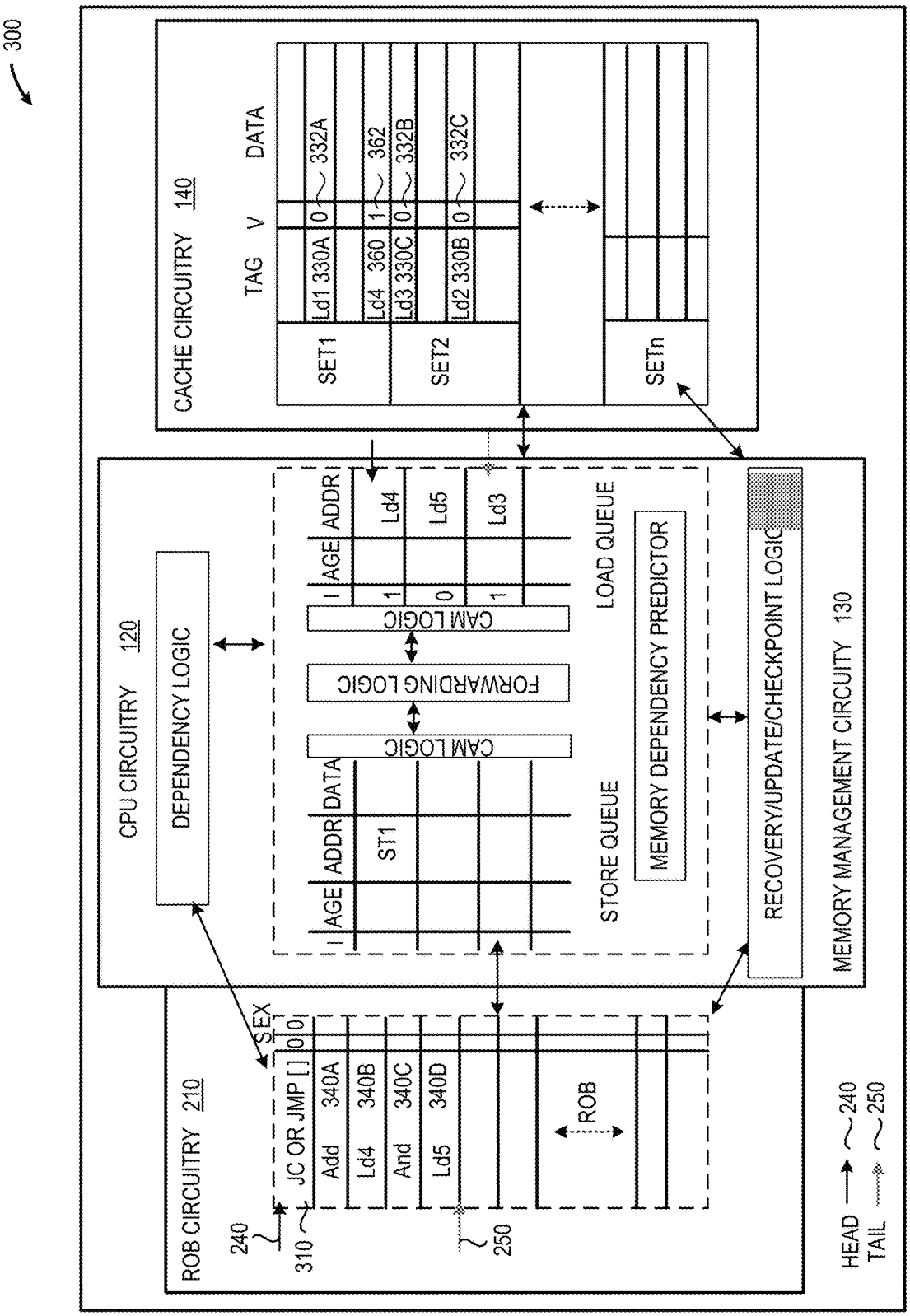
FIG. 3C is a schematic diagram of the illustrative system depicted in FIGS. 3A and 3B at branch retirement, in accordance with at least one embodiment described herein.

FIG. 3A is a schematic diagram of an illustrative system 300 upon detection of a branch mis-prediction type side channel attack, in accordance with at least one embodiment described herein. FIG. 3B is a schematic diagram of the illustrative system 300 with all of the speculative loads in the branch path invalidated in response to detecting the branch mis-prediction type side channel attack, in accordance with at least one embodiment described herein. FIG. 3C is a schematic diagram of the illustrative system 300 at branch retirement, in accordance with at least one embodiment described herein.

Referring now to FIG. 3A, the system 300 detects the branch mis-prediction. As depicted in FIG. 3A, the head pointer 240 has not yet reached the corresponding JMP or JC instruction 310 (i.e. it is not yet retirement time for the JMP/JC instruction 310). The same is true for the data included in the load queue portion of the load-store queue circuitry 260. The data loaded into the cache circuitry 140 represents the state of all the speculative loads executed after the branch instruction.

Referring next to FIG. 3B, the system 300, upon detecting the branch mis-prediction 310, the memory management circuitry 130 invalidates all of the subsequent speculative load instructions 312A, 312B, and 312C in the branch path. In some embodiments, the tail pointer 250 may be adjusted. The invalidation of the branch instructions propagates to every of the cache circuitry 140 to prevent any side-channel leakage. In addition, the memory management circuitry 130 transitions the speculative branch prediction indicator flag 320 associated with the JMP/JC instruction 310 from a first logical state (e.g., a logical value of "1") to a second logical state (e.g., a logical value of "0").

Referring next to FIG. 3C, the system 300, retires the branch instruction 310. As depicted in FIG. 3C, instructions 304A, 340B, 340C, 340D have been along right branch have been fetched, may be executed, and in some instances, the execution of some or all of the fetched instructions 340A-340D may be completed. The load queue portion of the load-store queue circuitry 260 includes the data associated with LOAD instruction 340B ("Ld4") and LOAD instruction 340D ("Ld5"). The cache circuitry 140 also includes the data associated with LOAD instruction ("Ld4") 360 and has associated a VALID data flag 362 with the data. Similarly, the data 330A, 330B, and 330C associated with LOAD instructions 312A, 312B, and 312C (respectively) is associated with an invalid data flag 332A, 332B, and 332C. The JC/JMP instruction 310 commits like any regular well-behaved instruction.

It should be noted, that as compared to exception scenario on speculative loads, branch mis-prediction is more common and dependent on workload characteristics. Consequently, when the processor circuitry 120 detects a branch mis-speculation, the cache state clean-up operations for all consequent executed speculative loads may affect overall system performance and bandwidth (as well as energy/power) profiles. A potential solution is to add a speculative bit (X bit) and H/W thread ID (1 bit for 2 H/W threads) per cache line. On mis-speculation detection, all lines for corresponding H/W thread and X=1 would be invalidated. This comes at cost of higher cache H/W overhead, size, more design touchpoints, but the proposed invalidation could be done by a single command to cache subsystem instead of sending corresponding tags one by one. This would alleviate some of the performance/bandwidth issues if at all, that becomes a concern.

In a typical hyper-threading scenario, attacker may own more than 1 thread at the same time, depending on system software scheduling policies. With a first thread performing the intended malicious speculative load, a second co-scheduled thread may perform a similar secret data (brought in by co-occurring thread) dependent load instruction and consequently leak out the secret via reload phase of FLUSH+ RELOAD. This is because the invalidation, as depicted in FIGS. 2A, 2B and 3A-3C, would not extend to the second thread's data dependent loads. The data loads would remain the cache circuitry 140 from which an attacker could later architecturally extract the secret. Two systems are possible to address this issue:

In a first plurality of embodiments, the re-order buffer ("ROB") may be partitioned according to hardware threads. Thus, a potential solution would involve invalidating any dependent or all executed loads in the corresponding speculative window, irrespective of hardware thread ownership. For the other hardware threads executing on the same core in the processor circuitry 120, data representative of a global "age" (or similar thereof) may be used to identify the loads in the exact speculative window. In embodiments, the data representative of the global age may be found as part of the Load-Store queue entry fields in the core memory execution unit. This would minimize the likelihood of speculative cache side-channel attacks through hyper-threads. Such a solution would enhance the overhead (performance, bandwidth, power impact) of proposed recovery.

In a second plurality of embodiments, each line in the cache circuitry 140 includes one or more indicators or flags that provide an indication that the data contained therein is a result of a speculative execution of an instruction and also indicative of thread ownership. The data associated with the cache line provides two pieces of information—first, that the data contained in the cache line has been loaded based on a speculatively executed instruction; and second, an indication of the hyperthread responsible for speculatively executing the instruction. For example, in some embodiments, one (1) bit per cache line ("X-bit") provides an indication of whether the data held in the cache line is based on a speculatively executed instruction. As used herein the term "speculatively executed" may refer to either or both: (a) Out of Order Processing window; and/or (b) Branch prediction till resolution duration. In embodiments, the logical state of the X-bit may be based on a "1 bit speculative indicator" flowing through the cache circuitry 140 and possibly the memory management circuitry 130 during the execution of a LOAD instruction, or alternatively, may be performed on basis of "is corresponding load speculative according to ROB-LSQ" check/verification on corresponding fill operation into the cache circuitry 140.

Initially, speculative data loads to the cache circuitry may have X=1 for corresponding lines. On retirement, the tag is sent to the cache circuitry 140 and/or the memory management controller 130, which transitions the logical state to X=0. The thread ID bit/s (for L1 and L2) would indicate which H/W thread of the processor circuitry 120 executing the respective thread. Based on the association of these two pieces of information to the data loaded into the cache circuitry, the systems and methods described herein prevent a first hardware thread from accessing speculative data loaded into the cache circuitry by a second hardware thread. is preventing one H/W thread to access another H/W thread's cache lines which are in the speculative state (i.e., a cache line having an associated tag of X=1). The restrictions do not apply if the line is in the non-speculative state (i.e., a cache line having an associated tag of X=0). Consequently, any hyper-thread would not be able to access the cache lines with secret data or secret dependent data access, brought in speculatively by another thread.

Similar to threads executing on the same core in processor circuitry 120, cross-core attacks could be performed from different cores by probing the cache circuitry 140. In a typical Flush+Reload attack, data is initially flushed from the cache circuitry, for example using a CLFLUSH operation. Here also, tagging the speculative cache line with an X bit may prevent cross-core threads from accessing data included in the speculative cache line. Using an X bit associated with the cache line, data representative of the core responsible for the speculatively executed instruction that loaded data into the cache line and some existing core identifier on cache coherent mesh to implement a policy such as "One core cannot access cache data loaded into the cache circuitry 140 as a result of an instruction speculatively executed by another thread (i.e., cache data having a logically associated bit X=1)." There are no restrictions imposed when X=0. Such a solution may be further simplified to prevent any access to speculative lines in the cache circuitry (ones with X=1) regardless of thread ownership. As the core which requested the original speculative load can access the line from its L1/L2 in an inclusive cache system, no performance hits are taken by the corresponding thread (no stalling required for it).

In prime and probe type side-channel attacks, the attacker first primes one or more cache sets by doing a series of data loads. In speculative cache side channel attacks, the attacker manipulates the speculative control flow or exploits the out of order execution property of modern CPUs and forces the CPU to execute a set of tailored instructions speculatively. The CPU will eventually flush those speculative instructions but the loads in the cache will remain until replaced under the cache eviction policy of the system. Attacker than probe the cache and identify the evicted lines by measuring the cache access times.

In our proposed solution, the modifications on the cache during the speculative execution window are rolled back if those speculative instructions are retired without being committed. Since any change in the cache content during the speculative window does not stay persistent, they cannot be observable by the attacker. In embodiments, one or more cache lines may be reserved to receive data based on one or more speculatively executed instructions.

Figure 4:
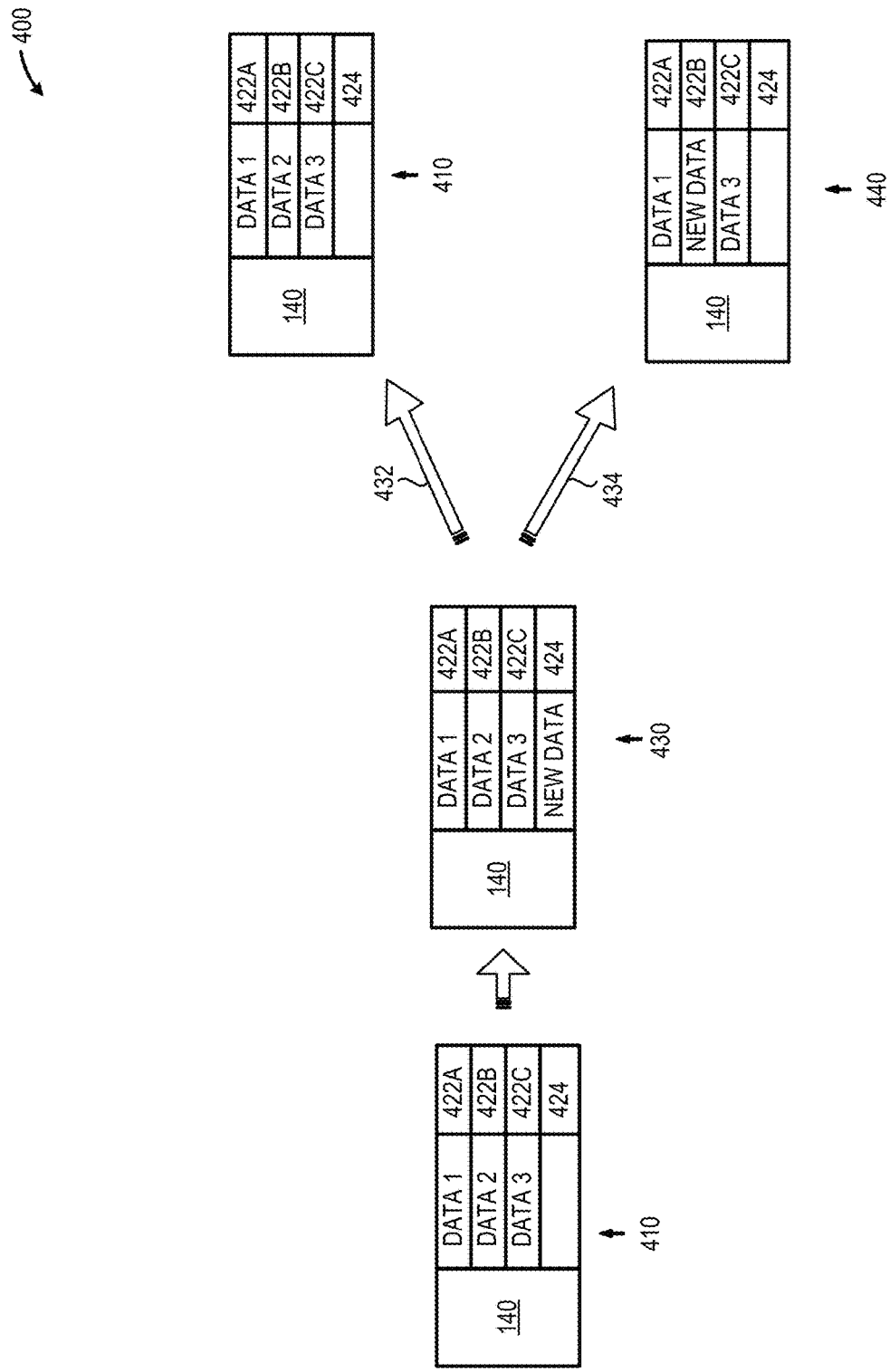
FIG. 4 depicts an illustrative system in which a cache line is reserved or held open to receive data transferred from system memory by a speculatively executed instruction, in accordance with at least one embodiment described herein.

FIG. 4 depicts an illustrative system 400 in which a cache line 420 is reserved or held open to receive data transferred from system memory 170 by a speculatively executed instruction 122, in accordance with at least one embodiment described herein. As depicted in FIG. 4, at microarchitectural cache state 410, the cache circuitry 140 includes an empty or vacant cache line 424, previously loaded DATA1 on a first cache line 422A, previously loaded DATA2 on a second cache line 422B, and previously loaded DATA3 on a third cache line 422C. The memory management circuitry 130 maintains cache line 424 in an OPEN or vacant condition such that cache line 424 is available for data transferred from system memory circuitry 170 based upon a speculatively executed instruction 122.

In microarchitectural cache state 420, NEWDATA is transferred from system memory circuitry 170 to the OPEN or vacant cache line 424 in the cache circuitry 140 based upon the speculative execution of one or more instructions 122 by the processor circuitry 120. NEWDATA is maintained in cache line 424 pending the resolution of the speculatively executed instruction 122 that caused the transfer of NEWDATA to the cache circuitry 140.

If the speculatively executed instruction 122 that caused the transfer NEWDATA to the OPEN or vacant cache line 424 does not successfully complete, remains unretired, or is otherwise flushed 432, the initial microarchitectural state 410 of the cache circuitry 140 is restored and NEWDATA is flushed from the cache circuitry 140, restoring cache line 424 to an OPEN or vacant condition.

If the speculatively executed instruction 122 successfully completes and/or is retired 434, the memory management circuitry 130 evicts the data stored in one of the previously loaded cache lines (422A, 422B, 422C) in accordance with a defined cache eviction policy, and NEWDATA is copied from cache line 424 to the recently evicted cache line, thereby restoring cache line 424 to an OPEN or vacant condition. The resultant microarchitectural state 440 includes previously loaded DATA1 on a first cache line 422A, previously loaded DATA3 on a third cache line 422C, and NEWDATA loaded in cache line 422B.

Figure 5:
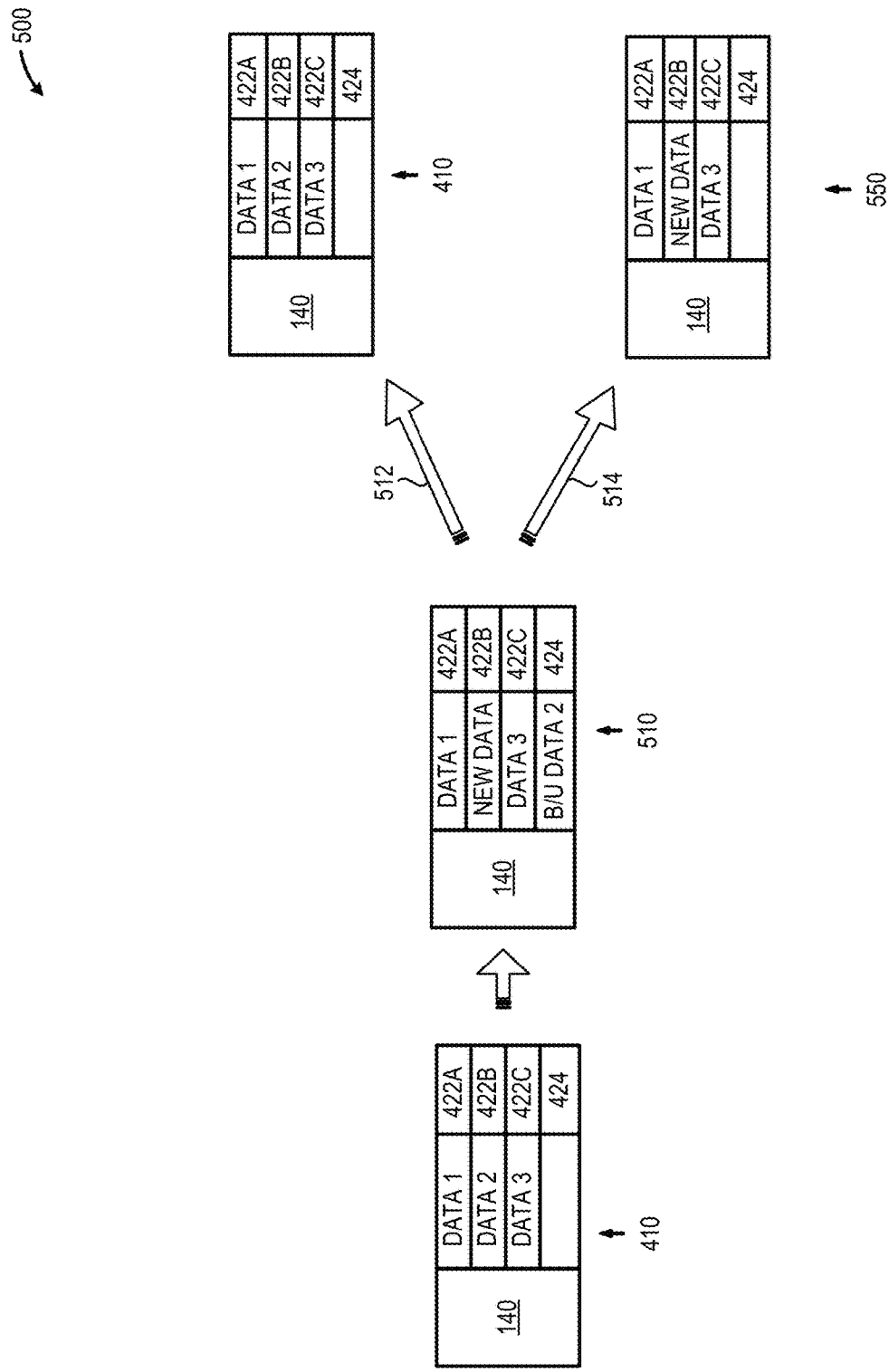
FIG. 5 depicts an illustrative system in which the memory management circuitry evicts data previously loaded into the cache circuitry to accommodate the storage of NEWDATA associated with a speculatively executed instruction, and stores a back-up copy of the evicted data in an OPEN or vacant cache line pending resolution of the speculatively executed instruction 122, in accordance with at least one embodiment described herein.

FIG. 5 depicts an illustrative system 500 in which the memory management circuitry 130 evicts data previously loaded into the cache circuitry 140 to accommodate the storage of NEWDATA associated with a speculatively executed instruction 122, and stores a back-up copy of the evicted data in an OPEN or vacant cache line 424 pending resolution of the speculatively executed instruction 122, in accordance with at least one embodiment described herein. Data transferred to the cache circuitry 140 may be loaded into a cache line from which the memory management circuitry has evicted data based upon an established cache eviction policy. The evicted data is stored in cache line 424 until the resolution of the speculatively executed instruction 122 that caused the data transfer to the cache circuitry 140.

As depicted in FIG. 5, in an initial microarchitectural cache state 410, the cache circuitry 140 includes an OPEN or vacant cache line 424. In embodiments, this OPEN or vacant cache line 424 may be used to store backed-up data. The cache circuitry 140 further includes: previously loaded DATA1 on a first cache line 422A; previously loaded DATA2 on a second cache line 422B; and, previously loaded DATA3 on a third cache line 422C. Cache line 424 remains OPEN or vacant to accept back-up cache data that is evicted by the memory management circuitry 130 to accommodate a data transfer from system memory 170 based upon the speculative execution of one or more instructions 122.

At microarchitectural cache state 510, the memory management circuitry 130 evicts DATA2 from cache line 422B, in accordance with a defined cache eviction policy. Memory management circuitry 130 then transfers NEWDATA to cache line 422B. Memory management circuitry 130 stores a back-up copy DATA2 in the OPEN or vacant cache line 424 pending the resolution of the speculatively executed instruction 122 that caused the transfer of NEWDATA to cache line 422B.

If the speculatively executed instruction 122 that caused the transfer of NEWDATA to cache line 422B does not successfully complete, is flushed, and/or remains unretired 512, the initial cache circuitry microarchitectural state 410 is restored by flushing NEWDATA from cache line 422B and copying the backed up DATA2 from cache line 424 to cache line 422B.

If the speculatively executed instruction 122 that caused the transfer of NEWDATA to cache line 422B successfully completes and/or retires 514, the memory management circuitry 130 maintains NEWDATA in cache line 422B and DATA2 is evicted from cache line 424. The resultant microarchitectural state 550 includes an OPEN or vacant cache line 424; previously loaded DATA1 in the first cache line 422A; previously loaded DATA3 in the third cache line 422C, and NEWDATA loaded in the second cache line 422B.

Figure 6:
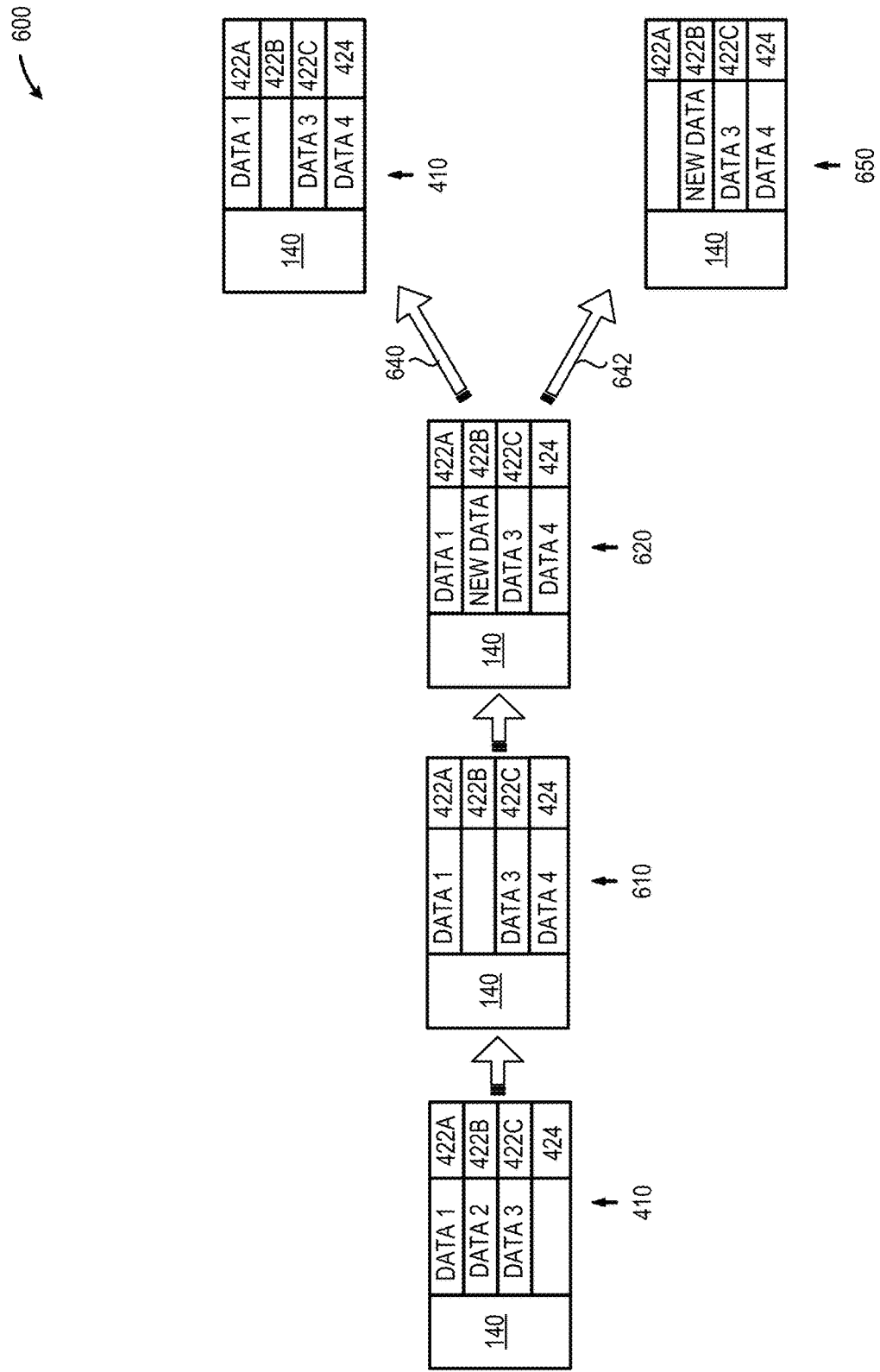
FIG. 6 depicts an illustrative system in which the memory management circuitry evicts data previously loaded into the cache circuitry according to an established cache eviction policy in order to maintain an OPEN or vacant cache line sufficient to accommodate the storage of NEWDATA associated with a speculatively executed instruction, in accordance with at least one embodiment described herein.

FIG. 6 depicts an illustrative system 600 in which the memory management circuitry 130 evicts data previously loaded into the cache circuitry 140 according to an established cache eviction policy in order to maintain an OPEN or vacant cache line sufficient to accommodate the storage of NEWDATA associated with a speculatively executed instruction 122, in accordance with at least one embodiment described herein. In such embodiments, the memory management circuitry 130 maintains at least one cache line in an OPEN or vacant state to accommodate the transfer of NEWDATA from system memory circuitry 170 to the cache circuitry 140 based on a speculatively executed instruction 122.

At microarchitectural cache state 410, the cache circuitry 140 includes an empty or vacant cache line 424, previously loaded DATA1 on a first cache line 422A, previously loaded DATA2 on a second cache line 422B, and previously loaded DATA3 on a third cache line 422C. The memory management circuitry 130 has maintained cache line 424 in an OPEN or vacant condition such that cache line 420 is available for data transferred from system memory circuitry 170.

At microarchitectural cache state 610, the memory management circuitry 130 loads DATA4 into the vacant cache line 424 and evicts DATA2 from the second cache line 422B in accordance with an established cache eviction policy. Thus, the memory management circuitry 130 now maintains cache line 422B in an OPEN or vacant state.

At microarchitectural cache state 620, the memory management circuitry 130 transfers NEWDATA to the OPEN or vacant cache line 422B in response to speculative execution of an instruction 122 by the processor circuitry 120. The memory management circuitry 130 maintains NEWDATA in cache line 422B pending the resolution of the speculatively executed instruction 122.

If the speculatively executed instruction 122 that caused the transfer of NEWDATA to cache line 422B does not successfully complete, is flushed, and/or remains unretired 640, the memory management circuitry 130 evicts NEWDATA from cache line 422B. The eviction of NEWDATA from cache line 422B restores the cache circuitry to microarchitectural state 610, the microarchitectural state of the cache circuitry 140 immediately prior to loading NEWDATA.

If the speculatively executed instruction 122 that caused the transfer of NEWDATA 630 to cache line 422B successfully completes and/or retires 642, the memory management circuitry maintains NEWDATA in the second cache line 422B and evicts DATA1 from the first cache line 422A in accordance with the defined cache eviction policy. The resultant microarchitectural state 650 includes a vacant cache line 422A; previously loaded DATA3 on the third cache line 422C; previously loaded DATA4 on a fourth cache line 424; and NEWDATA loaded in the second cache line 422B.

Figure 7:
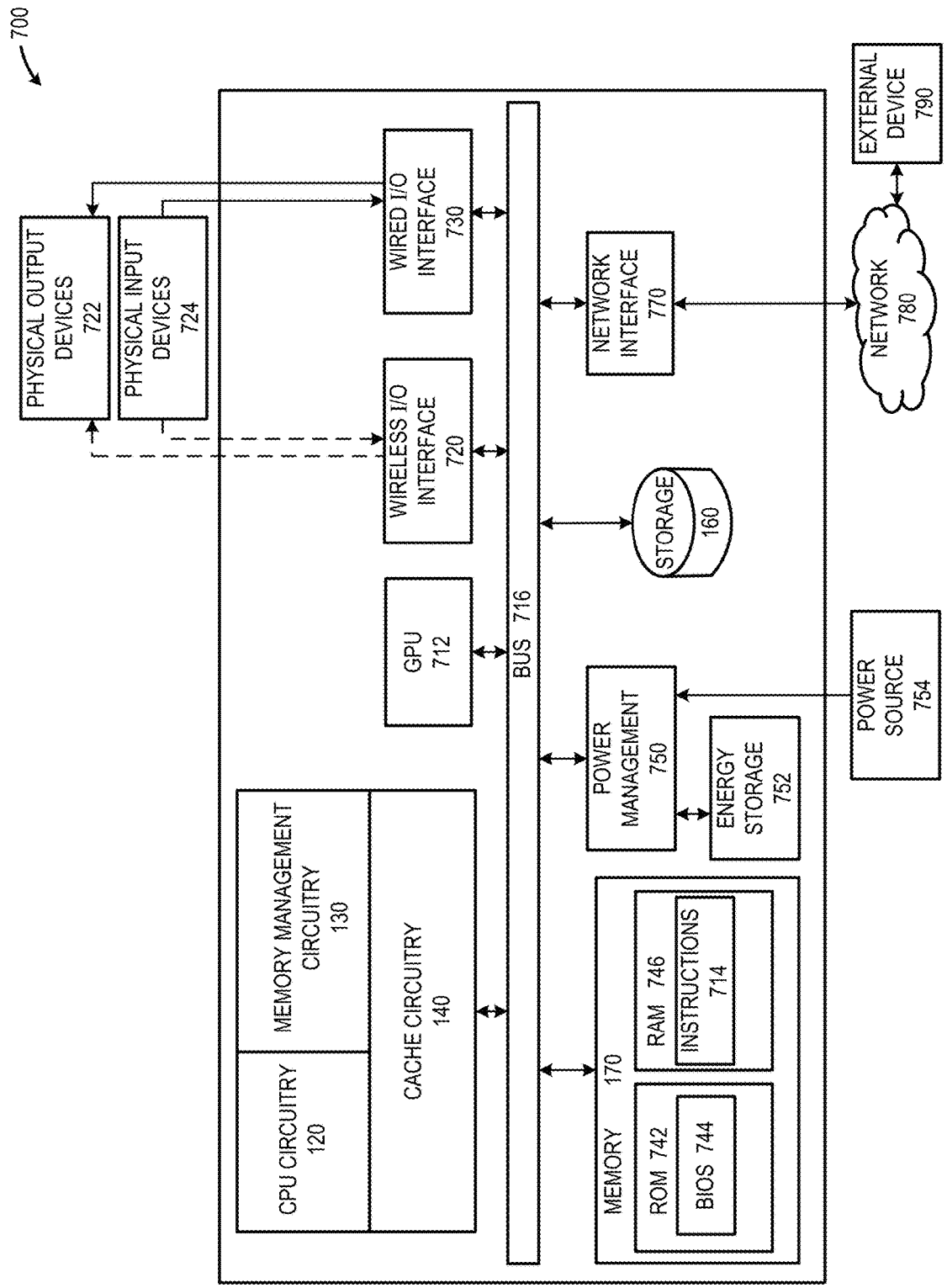
FIG. 7 is a schematic diagram of an illustrative electronic, processor-based, device that includes a CPU having processor circuitry, memory management circuitry capable of maintaining consistency between a system architectural state and cache microarchitectural state, cache circuitry, in accordance with at least one embodiment described herein.

FIG. 7 is a schematic diagram of an illustrative electronic, processor-based, device 700 that includes a CPU 110 having processor circuitry 120, memory management circuitry 130 capable of maintaining consistency between a system architectural state and cache microarchitectural state, cache circuitry 140, in accordance with at least one embodiment described herein. The processor-based device 700 may additionally include one or more of the following: a graphical processing unit 712, a wireless input/output (I/O) interface 720, a wired I/O interface 730, system memory 170, power management circuitry 750, a non-transitory storage device 160, and a network interface 770. The following discussion provides a brief, general description of the components forming the illustrative processor-based device 700. Example, non-limiting processor-based devices 700 may include, but are not limited to: smartphones, wearable computers, portable computing devices, handheld computing devices, desktop computing devices, blade server devices, workstations, and similar.

The processor-based device 700 includes processor circuitry 120 and memory management circuitry 130. In embodiments, the memory management circuitry 130 maintains consistency between the architectural state of the processor-based device 700 and the microarchitectural state of the cache circuitry 140 using the systems and methods described herein. Generally, to protect against flush+reload type side channel attacks, the memory management circuitry 130 invalidates data loaded into the cache circuitry 140 by a speculatively executed instruction upon detection of mis-speculation (e.g., an exception of branch mis-prediction detection). Additional controls are provided to pre-empt cross-core or hyperthreading attacks in a speculative window. To protect against prime+probe type attacks, the memory management circuitry 130 maintains a portion (e.g., a cache line) in an OPEN or vacant state to accept data transferred from system memory circuitry 170 based on speculative execution of an instruction 122 by the processor circuitry 120. If the speculatively executed instruction 122 does not complete successfully or remains unretired, the memory management circuitry 130 evicts the data loaded by the speculatively executed instruction and restores the cache circuitry 140 to the microarchitectural state immediately prior to the data load by the speculatively executed instruction 122.

In some embodiments, the processor-based device 700 includes graphics processor circuitry 712 capable of executing machine-readable instruction sets 714 and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 120 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The processor-based device 700 includes a bus or similar communications link 716 that communicably couples and facilitates the exchange of information and/or data between various system components including the processor circuitry 120, the graphics processor circuitry 712, one or more wireless I/O interfaces 720, one or more wired I/O interfaces 730, the system memory 170, one or more storage devices 160, and/or one or more network interfaces 770. The processor-based device 700 may be referred to in the singular herein, but this is not intended to limit the embodiments to a single processor-based device 700, since in certain embodiments, there may be more than one processor-based device 700 that incorporates, includes, or contains any number of communicably coupled, collocated, or remote networked circuits or devices.

The processor circuitry 120 may include any number, type, or combination of currently available or future developed devices capable of executing machine-readable instruction sets. The processor circuitry 120 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks need not be described in further detail herein, as they will be understood by those skilled in the relevant art. The bus 716 that interconnects at least some of the components of the processor-based device 700 may employ any currently available or future developed serial or parallel bus structures or architectures.

The system memory 170 may include read-only memory ("ROM") 742 and random access memory ("RAM") 746. A portion of the ROM 742 may be used to store or otherwise retain a basic input/output system ("BIOS") 744. The BIOS 744 provides basic functionality to the processor-based device 700, for example by causing the processor circuitry 120 to load and/or execute one or more machine-readable instruction sets 714. In embodiments, at least some of the one or more machine-readable instruction sets 714 cause at least a portion of the processor circuitry 120 to provide, create, produce, transition, and/or function as a dedicated, specific, and particular machine, for example a word processing machine, a digital image acquisition machine, a media playing machine, a gaming system, a communications device, a smartphone, or similar.

The processor-based device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The processor-based device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include, but are not limited to: universal serial bus (USB), IEEE 1394 ("FireWire"), and similar.

The processor-based device 700 may include one or more communicably coupled, non-transitory, data storage devices 160. The data storage devices 160 may include one or more hard disk drives (HDDs) and/or one or more solid-state storage devices (SSDs). The one or more data storage devices 160 may include any current or future developed storage appliances, network storage devices, and/or systems. Non-limiting examples of such data storage devices 160 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 160 may include one or more removable storage devices, such as one or more flash drives, flash memories, flash storage units, or similar appliances or devices capable of communicable coupling to and decoupling from the processor-based device 700.

The one or more data storage devices 160 may include interfaces or controllers (not shown) communicatively coupling the respective storage device or system to the bus 716. The one or more data storage devices 160 may store, retain, or otherwise contain machine-readable instruction sets, data structures, program modules, data stores, databases, logical structures, and/or other data useful to the processor circuitry 120 and/or graphics processor circuitry 712 and/or one or more applications executed on or by the processor circuitry 120 and/or graphics processor circuitry 712. In some instances, one or more data storage devices 160 may be communicably coupled to the processor circuitry 120, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or WiFi®, etc.).

Processor-readable instruction sets 714 and other programs, applications, logic sets, and/or modules may be stored in whole or in part in the system memory 170. Such instruction sets 714 may be transferred, in whole or in part, from the one or more data storage devices 160. The instruction sets 714 may be loaded, stored, or otherwise retained in system memory 170, in whole or in part, during execution by the processor circuitry 120 and/or graphics processor circuitry 712.

The processor-based device 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the processor-based device 700. The power source 754 may include, but is not limited to, a solar power system, a commercial electric grid, a portable generator, an external energy storage device, or any combination thereof.

The network interface 770 may communicate with one or more external devices 790 such as one or more cloud-based servers, processing units, graphics processing units, or similar via one or more networks 780. In embodiments, the one or more networks 780 may include one or more wired or wireless local area networks, one or more wired or wireless wide area networks, one or more wired or wireless worldwide networks (e.g., the Internet), or combinations thereof.

For convenience, the processor circuitry 120, the graphics processor circuitry 712, the wireless I/O interface 720, the wired I/O interface 730, the system memory 170, the power management circuitry 750, the storage device 160, and the network interface 770 are illustrated as communicatively coupled to each other via the bus 716, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor circuitry 120, the memory management circuitry 130, and/or the graphics processor circuitry 712. In some embodiments, all or a portion of the bus 716 may be omitted and the components are coupled directly to each other using suitable wired or wireless connections.

Figure 8:
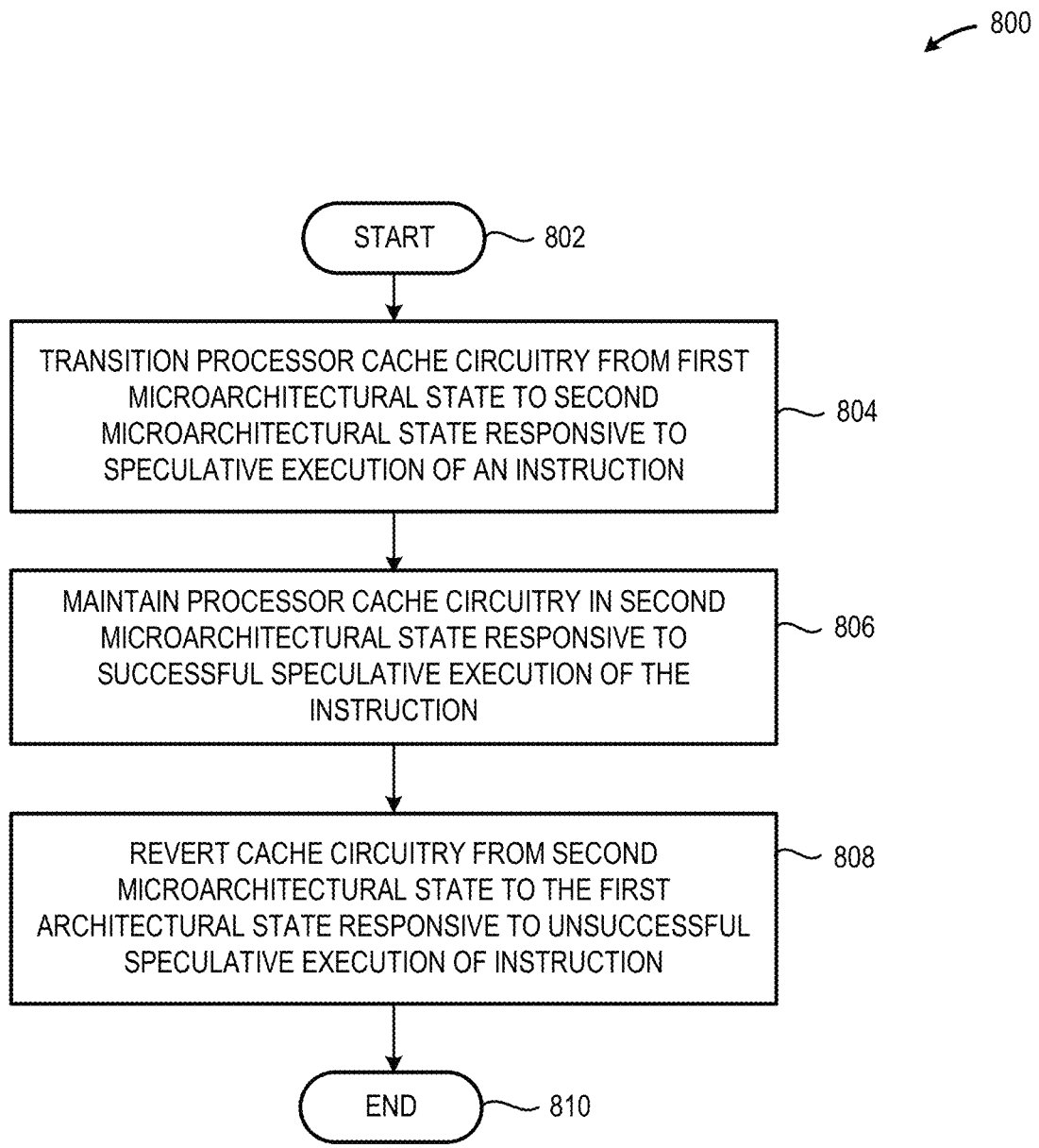
FIG. 8 is a high-level flow diagram of an illustrative method of maintaining consistency between the system architectural state and the microarchitectural state of the cache circuitry using memory management circuitry, in accordance with at least one embodiment described herein.

FIG. 8 is a high-level flow diagram of an illustrative method 800 of maintaining consistency between the system architectural state and the microarchitectural state of the cache circuitry 140 using memory management circuitry 130, in accordance with at least one embodiment described herein. The method 800 beneficially and advantageously minimizes or even eliminates the presence of data in the cache circuitry 140 that may provide useful information to an attacker using one or more side-channel exploits. In general, the method 800 permits data transfers to the cache circuitry 140 based on speculative execution of an instruction 122. If the speculatively executed instruction 122 successfully completes or is retired, the memory management circuitry 130 permits the data transferred to the cache circuitry 140 to remain. If the speculatively executed instruction does not successfully complete, is flushed, and/or remains unretired, the memory management circuitry 130 evicts the data transferred by the speculatively executed instruction 122 and restores the cache circuitry 140 to the microarchitectural state immediately prior to the data transfer caused by the speculatively executed instruction 122. The method 800 commences at 802.

At 804, speculative execution of one or more instructions 122 by the processor circuitry 120 causes the memory management circuitry to transition the cache circuitry 140 from a first microarchitectural state to a second microarchitectural state. In at least some implementations, the memory management circuitry 130 may store data representative of the first microarchitectural state.

At 806, the memory management circuitry 130 maintains the cache circuitry 140 in the second microarchitectural state in response to a successful completion and/or retirement of the speculatively executed instruction 122.

At 808, the memory management circuitry 130 reverts the cache circuitry 140 from the second microarchitectural state to the first microarchitectural state in response to an unsuccessful completion, flushing, and/or retirement of the speculatively executed instruction 122. The method 800 concludes at 810.

While FIG. 8 illustrates various operations according to one or more embodiments, it is to be understood that not all of the operations depicted in FIG. 8 are necessary for other embodiments. Indeed, it is fully contemplated herein that in other embodiments of the present disclosure, the operations depicted in FIG. 8, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD- ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods that maintain consistency between a system architectural state and a microarchitectural state in the system cache circuitry to prevent a side-channel attack from accessing secret information. Speculative execution of one or more instructions by the processor circuitry causes memory management circuitry to transition the cache circuitry from a first microarchitectural state to a second microarchitectural state. The memory management circuitry maintains the cache circuitry in the second microarchitectural state in response to a successful completion and/or retirement of the speculatively executed instruction. The memory management circuitry reverts the cache circuitry from the second microarchitectural state to the first microarchitectural state in response to an unsuccessful completion, flushing, and/or retirement of the speculatively executed instruction.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for maintaining consistency between a system architectural state and a microarchitectural state in the system cache circuitry to prevent a side-channel attack from accessing secret information stored in the cache circuitry based on the speculative execution of an instruction by processor circuitry.

According to example 1, there is provided a processor cache management system. The system may include: processor circuitry; cache circuitry coupled to the processor circuitry; memory management circuitry coupled to the processor cache; a storage device containing machine-readable instructions that, when executed, cause the memory management circuitry to:

cause a transition the cache circuitry from a first microarchitectural state to a second microarchitectural state responsive to speculative execution of a first instruction by the processor circuitry; maintain the cache circuitry in the second microarchitectural state responsive to a successful speculative execution of the first instruction by the processor circuitry; and cause the cache circuitry to revert from the second microarchitectural state to the first microarchitectural state responsive to an unsuccessful speculative execution of the first instruction by the processor circuitry.

Example 2 may include elements of example 1 where the machine-executable instructions that cause the memory management circuitry to cause a transition the cache circuitry from a first microarchitectural state to a second microarchitectural state responsive to speculative execution of the first instruction by the processor circuitry may further cause the memory management circuitry to: cause a transition the cache circuitry from a first microarchitectural state to a second microarchitectural state responsive to speculative execution of the first instruction by the processor circuitry; wherein the first microarchitectural state includes the cache circuitry in which at least a portion of the cache circuitry is in an invalidated state; and wherein the second microarchitectural state includes data transferred to the invalidated portion of the cache circuitry based on the speculative execution of the first instruction by the processor circuitry.

Example 3 may include elements of any of examples 1 or 2 where the instructions that cause the memory management circuitry to cause a transition the cache circuitry from a first microarchitectural state to a second microarchitectural state responsive to speculative execution of the first instruction by the processor circuitry further cause the memory management circuitry to: transition a flag bit associated with the data transferred to the invalidated portion of the cache circuitry to a first state indicative of data present in the cache circuitry that is associated with the speculatively executed first instruction; wherein the machine-executable instructions further cause the memory management circuitry to block access to the data transferred to the invalidated portion of the cache circuitry by a second instruction while the flag bit remains in the first state; and where the instructions that cause the memory management circuitry to maintain the cache circuitry in the second microarchitectural state responsive to a successful speculative execution of the first instruction by the processor circuitry further cause the memory management circuitry to: transition the flag bit associated with the data transferred to the invalidated portion of the cache circuitry to a second state, the second state indicative of the successful speculative execution of the one or more instructions by the processor circuitry; wherein the machine-executable instructions further cause the memory management circuitry to provide access to the data transferred to the invalidated portion of the cache circuitry by a second instruction while the flag bit remains in the first state.

Example 4 may include elements of any of examples 1 through 3 where the speculatively executed first instruction includes one or more instructions executed by a first core circuit included in the processor circuitry; and where the second instruction includes one or more instructions executed by a second core circuit included in the processor circuitry.

Example 5 may include elements of any of examples 1 through 4 where the speculatively executed first instruction includes one or more instructions executed by a first hyperthread executed on the processor circuitry; and where the second instruction includes one or more instructions executed by a second hyperthread executed on the processor circuitry.

Example 6 may include elements of any of examples 1 through 5 where the machine-executable instructions that cause the memory management circuitry to cause a transition the cache circuitry from a first microarchitectural state to a second microarchitectural state responsive to speculative execution of a first instruction by the processor circuitry further cause the memory management circuitry to: cause a storage of data representative of the first microarchitectural state; and where the machine-executable instructions that cause the memory management circuitry to cause the cache circuitry to revert from the second microarchitectural state to the first microarchitectural state responsive to an unsuccessful speculative execution of the first instruction by the processor circuitry further cause the memory management circuitry to: copy the stored data representative of the first microarchitectural state to the cache circuitry.

Example 7 may include elements of any of examples 1 through 6 where the machine-executable instructions further cause the memory management circuitry to maintain at least a first portion of the cache circuitry in a known state; where the machine-executable instructions that cause the memory management circuitry to cause the transition of the cache circuitry from the first microarchitectural state to the second microarchitectural state responsive to the speculative execution of the first instruction by the processor circuitry further cause the memory management circuitry to: cause the transition of the first portion of the cache circuitry from the known state to the second microarchitectural state responsive to speculative execution of the first instruction by the processor circuitry, wherein the second microarchitectural state includes data transferred from system memory circuitry to the first portion of the cache circuitry based on the speculative execution of the first instruction by the processor circuitry.

Example 8 may include elements of any of examples 1 through 7 where the machine-executable instructions that cause the memory management circuitry to maintain the cache circuitry in the second microarchitectural state responsive to a successful speculative execution of the first instruction by the processor circuitry further cause the memory management circuitry to: cause a copy of the data transferred from the system memory circuitry from the first portion of the cache circuitry to a second portion of the processor cache circuitry; and cause the first portion of the processor cache memory to revert back to the first known state.

Example 9 may include elements of any of examples 1 through 8 where the machine-executable instructions that cause the memory management circuitry to cause the cache circuitry to revert from the second microarchitectural state to the first microarchitectural state responsive to an unsuccessful speculative execution of the first instruction by the processor circuitry further cause the memory management circuitry to: cause the a flush of the data transferred from the system memory circuitry from the first portion of the cache circuitry; and cause the first portion of the processor cache memory to revert back to the first known state.

Example 10 may include elements of any of examples 1 through 9 where the first known state includes known data stored in the first portion of the processor cache memory; where the instructions that cause the memory management circuitry to cause the transition of the first portion of the cache circuitry from the known state to the second microarchitectural state responsive to speculative execution of the first instruction by the processor circuitry further cause the memory management circuitry to: copy the known data stored in the first portion of the cache circuitry to a second portion of the cache circuitry; and transfer data from system memory circuitry to the first portion of the cache circuitry based on the speculative execution of the first instruction by the processor circuitry.

Example 11 may include elements of any of examples 1 through 10 where the instructions that cause the memory management circuitry to cause the cache circuitry to revert from the second microarchitectural state to the first microarchitectural state responsive to an unsuccessful speculative execution of the first instruction by the processor circuitry further cause the memory management circuitry to: copy the known data from the second portion of the cache circuitry to the first portion of the cache circuitry; and invalidate the second portion of the cache circuitry.

Example 12 may include elements of any of examples 1 through 11 where the instructions that cause the memory management circuitry to maintain the cache circuitry in the second microarchitectural state responsive to a successful speculative execution of the first instruction by the processor circuitry further cause the cache circuitry to invalidate the second portion of the cache circuitry.

Example 13 may include elements of any of examples 1 through 12 where the instructions that cause the memory management circuitry to cause the transition of the first portion of the cache circuitry from the known state to the second microarchitectural state responsive to speculative execution of the first instruction by the processor circuitry further cause the memory management circuitry to: cause an eviction of data from the first portion of the cache circuitry; and transfer data from system memory circuitry to the first portion of the cache circuitry based on the speculative execution of the first instruction by the processor circuitry.

Example 14 may include elements of any of examples 1 through 13 where the instructions that cause the memory management circuitry to cause the cache circuitry to revert from the second microarchitectural state to the first microarchitectural state responsive to an unsuccessful speculative execution of the first instruction by the processor circuitry further cause the memory management circuitry to invalidate the second portion of the cache circuitry.

Example 15 may include elements of any of examples 1 through 14 where the instructions that cause the memory management circuitry to maintain the cache circuitry in the second microarchitectural state responsive to a successful speculative execution of the first instruction by the processor circuitry further cause the cache circuitry to cause an eviction of data from a third portion of the cache circuitry.

According to example 16, there is provided a non-transitory, machine-readable, storage device. The storage device includes instructions that, when executed by memory management circuitry, cause the memory management circuitry to: cause a transition of cache circuitry from a first microarchitectural state to a second microarchitectural state responsive to speculative execution of a first instruction by processor circuitry; maintain the cache circuitry in the second microarchitectural state responsive to a successful speculative execution of the first instruction by the processor circuitry; and cause the cache circuitry to revert from the second microarchitectural state to the first microarchitectural state responsive to an unsuccessful speculative execution of the first instruction by the processor circuitry.

Example 17 may include elements of example 16 where the machine-readable instructions that cause the memory management circuitry to cause the transition of the cache circuitry from the first microarchitectural state to the second microarchitectural state further cause the memory management circuitry to: cause a transition the cache circuitry from a first microarchitectural state to a second microarchitectural state responsive to speculative execution of the first instruction by the processor circuitry; where the first microarchitectural state includes the cache circuitry in which at least a portion of the cache circuitry is in an invalidated state; and where the second microarchitectural state includes data transferred to the invalidated portion of the cache circuitry based on the speculative execution of the first instruction by the processor circuitry.

Example 18 may include elements of any of examples 16 or 17 where the machine-readable instructions that cause the memory management circuitry to cause a transition the cache circuitry from a first microarchitectural state to a second microarchitectural state further cause the memory management circuitry to: transition a flag bit associated with the data transferred to the invalidated portion of the cache circuitry to a first state indicative of data present in the cache circuitry that is associated with the speculatively executed first instruction; wherein the machine-readable instructions further cause the memory management circuitry to block access to the data transferred to the invalidated portion of the cache circuitry by a second instruction while the flag bit remains in the first state; and where the instructions that cause the memory management circuitry to maintain the cache circuitry in the second microarchitectural state responsive to a successful speculative execution of the first instruction by the processor circuitry further cause the memory management circuitry to transition the flag bit associated with the data transferred to the invalidated portion of the cache circuitry to a second state, the second state indicative of the successful speculative execution of the one or more instructions by the processor circuitry; where the machine-readable instructions further cause the memory management circuitry to provide access to the data transferred to the invalidated portion of the cache circuitry by a second instruction while the flag bit remains in the first state.

Example 19 may include elements of any of examples 16 through 18 where the machine-readable instructions that cause the memory management circuitry to cause a transition the cache circuitry from a first microarchitectural state to a second microarchitectural state further cause the memory management circuitry to: cause a storage of data representative of the first microarchitectural state; and where the machine-executable instructions that cause the memory management circuitry to cause the cache circuitry to revert from the second microarchitectural state to the first microarchitectural state responsive to an unsuccessful speculative execution of the first instruction by the processor circuitry further cause the memory management circuitry to: copy the stored data representative of the first microarchitectural state to the cache circuitry.

Example 20 may include elements of any of examples 16 through 19 where the machine-readable instructions further include machine-readable instructions that cause the memory management circuitry to maintain at least a first portion of the cache circuitry in a known state; where the machine-executable instructions that cause the memory management circuitry to cause the transition of the cache circuitry from the first microarchitectural state to the second microarchitectural state responsive to the speculative execution of the first instruction by the processor circuitry further cause the memory management circuitry to: cause the transition of the first portion of the cache circuitry from the known state to the second microarchitectural state responsive to speculative execution of the first instruction by the processor circuitry, wherein the second microarchitectural state includes data transferred from system memory circuitry to the first portion of the cache circuitry based on the speculative execution of the first instruction by the processor circuitry.

Example 21 may include elements of any of examples 16 through 20 where the machine-readable instructions that cause the memory management circuitry to maintain the cache circuitry in the second microarchitectural state responsive to a successful speculative execution of the first instruction by the processor circuitry further cause the memory management circuitry to: cause a copy of the data transferred from the system memory circuitry from the first portion of the cache circuitry to a second portion of the processor cache circuitry; and cause the first portion of the processor cache memory to revert back to the known state.

Example 22 may include elements of any of examples 16 through 21 where the machine-readable instructions that cause the memory management circuitry to cause the cache circuitry to revert from the second microarchitectural state to the first microarchitectural state responsive to an unsuccessful speculative execution of the first instruction by the processor circuitry further cause the memory management circuitry to: cause the a flush of the data transferred from the system memory circuitry from the first portion of the cache circuitry; and cause the first portion of the processor cache memory to revert back to the first known state.

Example 23 may include elements of any of examples 16 through 22 where the known state includes known data stored in the first portion of the processor cache memory; where the instructions that cause the memory management circuitry to cause the transition of the first portion of the cache circuitry from the known state to the second microarchitectural state responsive to speculative execution of the first instruction by the processor circuitry further cause the memory management circuitry to: copy the known data stored in the first portion of the cache circuitry to a second portion of the cache circuitry; and transfer data from system memory circuitry to the first portion of the cache circuitry based on the speculative execution of the first instruction by the processor circuitry.

Example 24 may include elements of any of examples 16 through 23 where the instructions that cause the memory management circuitry to cause the cache circuitry to revert from the second microarchitectural state to the first microarchitectural state responsive to an unsuccessful speculative execution of the first instruction by the processor circuitry further cause the memory management circuitry to: copy the known data from the second portion of the cache circuitry to the first portion of the cache circuitry; and invalidate the second portion of the cache circuitry.

Example 25 may include elements of any of examples 16 through 24 where the instructions that cause the memory management circuitry to maintain the cache circuitry in the second microarchitectural state responsive to a successful speculative execution of the first instruction by the processor circuitry further cause the cache circuitry to invalidate the second portion of the cache circuitry.

Example 26 may include elements of any of examples 16 through 25 where the instructions that cause the memory management circuitry to cause the transition of the first portion of the cache circuitry from the known state to the second microarchitectural state responsive to speculative execution of the first instruction by the processor circuitry further cause the memory management circuitry to: cause an eviction of data from the first portion of the cache circuitry; and transfer data from system memory circuitry to the first portion of the cache circuitry based on the speculative execution of the first instruction by the processor circuitry.

Example 27 may include elements of any of examples 16 through 26 where the instructions that cause the memory management circuitry to cause the cache circuitry to revert from the second microarchitectural state to the first microarchitectural state responsive to an unsuccessful speculative execution of the first instruction by the processor circuitry further cause the memory management circuitry to: invalidate the second portion of the cache circuitry.

Example 28 may include elements of any of examples 16 through 27 where the instructions that cause the memory management circuitry to maintain the cache circuitry in the second microarchitectural state responsive to a successful speculative execution of the first instruction by the processor circuitry further cause the cache circuitry to cause an eviction of data from a third portion of the cache circuitry.

According to example 29, there is provided a method for protecting against side-channel attacks. The method may include: causing, by memory management circuitry, a transition of cache circuitry from a first microarchitectural state to a second microarchitectural state responsive to speculative execution of a first instruction by processor circuitry; maintaining, by the memory management circuitry, the cache circuitry in the second microarchitectural state responsive to a successful speculative execution of the first instruction by the processor circuitry; and causing, by memory management circuitry, a reversion of the cache circuitry from the second microarchitectural state to the first microarchitectural state responsive to an unsuccessful speculative execution of the first instruction by the processor circuitry.

Example 30 may include elements of example 30 where causing the transition of the cache circuitry from the first microarchitectural state to the second microarchitectural state comprises: causing, by the memory management circuitry, a transition of the cache circuitry from a first microarchitectural state to a second microarchitectural state responsive to speculative execution of the first instruction by processor circuitry; where the first microarchitectural state includes the cache circuitry in which at least a portion of the cache circuitry is in an invalidated state; and where the second microarchitectural state includes data transferred to the invalidated portion of the cache circuitry based on the speculative execution of the first instruction by the processor circuitry.

Example 31 may include elements of any of examples 29 or 30 where causing the transition of the cache circuitry from the first microarchitectural state to the second microarchitectural state comprises: transitioning, by the memory management circuitry, a flag bit associated with the data transferred to the invalidated portion of the cache circuitry to a first state indicative of data present in the cache circuitry that is associated with the speculatively executed first instruction; blocking access, by the memory management circuitry, to the data transferred to the invalidated portion of the cache circuitry by a second instruction while the flag bit remains in the first state; transitioning, by the memory management circuitry, the flag bit associated with the data transferred to the invalidated portion of the cache circuitry to a second state, the second state indicative of the successful speculative execution of the one or more instructions by the processor circuitry; and providing access, by the memory management circuitry, to the data transferred to the invalidated portion of the cache circuitry by a second instruction while the flag bit remains in the first state.

Example 32 may include elements of any of examples 29 through 31 where causing the transition of the cache circuitry from the first microarchitectural state to the second microarchitectural state comprises: causing, by the memory management circuitry, a storage of data representative of the first microarchitectural state; and where causing a reversion from the second microarchitectural state to the first microarchitectural state comprises: copying, by the memory management circuitry, the stored data representative of the first microarchitectural state to the cache circuitry.

Example 33 may include elements of any of examples 29 through 32, and the method may further include: maintaining, by the memory management circuitry, at least a first portion of the cache circuitry in a known state; where transitioning the cache circuitry from the first microarchitectural state to the second microarchitectural state comprises: causing, by the memory management circuitry, the transition of the first portion of the cache circuitry from the known state to the second microarchitectural state responsive to speculative execution of the first instruction by the processor circuitry, wherein the second microarchitectural state includes data transferred from system memory circuitry to the first portion of the cache circuitry based on the speculative execution of the first instruction by the processor circuitry.

Example 34 may include elements of any of examples 29 through 33 where maintaining the cache circuitry in the second microarchitectural state responsive to a successful speculative execution of the first instruction by the processor circuitry comprises: causing, by the memory management circuitry, a copy of the data transferred from the system memory circuitry from the first portion of the cache circuitry to a second portion of the cache circuitry; and causing, by the memory management circuitry, the first portion of the cache circuitry to revert back to the known state.

Example 35 may include elements of any of examples 29 through 34 where causing a reversion of the cache circuitry from the second microarchitectural state to the first microarchitectural state responsive to an unsuccessful speculative execution of the first instruction by the processor circuitry comprises: causing, by the memory management circuitry, a flush of the data transferred from the system memory circuitry from the first portion of the cache circuitry; and causing, by the memory management circuitry, the reversion of the first portion of the processor cache memory to the known state.

Example 36 may include elements of any of examples 29 through 35 where causing the transition of the first portion of the cache circuitry from the known state to the second microarchitectural state responsive to speculative execution of the first instruction by the processor circuitry comprises: copying, by the memory management circuitry, known data stored in the first portion of the cache circuitry to a second portion of the cache circuitry; and transferring, by the memory management circuitry, data from system memory circuitry to the first portion of the cache circuitry based on the speculative execution of the first instruction by the processor circuitry.

Example 37 may include elements of any of examples 29 through 36 where causing the reversion of the cache circuitry from the second microarchitectural state to the first microarchitectural state responsive to an unsuccessful speculative execution of the first instruction by the processor circuitry comprises: copying, by the memory management circuitry, the known data from the second portion of the cache circuitry to the first portion of the cache circuitry; and invalidating, by the memory management circuitry, the second portion of the cache circuitry.

Example 38 may include elements of any of examples 29 through 37 where maintaining the cache circuitry in the second microarchitectural state responsive to the successful speculative execution of the first instruction by the processor circuitry comprises: invalidating, by the memory management circuitry, the second portion of the cache circuitry.

Example 39 may include elements of any of examples 29 through 38 where causing the transition of the first portion of the cache circuitry from the known state to the second microarchitectural state responsive to speculative execution of the first instruction by the processor circuitry comprises: causing, by the memory management circuitry, an eviction of data from the first portion of the cache circuitry; and transferring, by the memory management circuitry, data from the system memory circuitry to the first portion of the cache circuitry based on the speculative execution of the first instruction by the processor circuitry.

Example 40 may include elements of any of examples 29 through 39 where causing a reversion of the cache circuitry from the second microarchitectural state to the first microarchitectural state responsive to the unsuccessful speculative execution of the first instruction by the processor circuitry comprises invalidating, by the memory management circuitry, the second portion of the cache circuitry.

Example 41 may include elements of any of examples 29 through 40 where maintaining the cache circuitry in the second microarchitectural state responsive to the successful speculative execution of the first instruction by the processor circuitry comprises: causing, by the memory management circuitry, an eviction of data from a third portion of the cache circuitry.

According to example 42, there is provided system for protecting against side-channel attacks. The system may include: means for causing transitioning cache circuitry from a first microarchitectural state to a second microarchitectural state responsive to speculative execution of a first instruction by processor circuitry; means for maintaining the cache circuitry in the second microarchitectural state responsive to a successful speculative execution of the first instruction by the processor circuitry; and means for reverting the cache circuitry from the second microarchitectural state to the first microarchitectural state responsive to an unsuccessful speculative execution of the first instruction by the processor circuitry.

Example 43 may include elements of example 42 where the means for transitioning the cache circuitry from the first microarchitectural state to the second microarchitectural state comprises: means for transitioning the cache circuitry from a first microarchitectural state to a second microarchitectural state responsive to speculative execution of the first instruction by processor circuitry; where the first microarchitectural state includes the cache circuitry in which at least a portion of the cache circuitry is in an invalidated state; and where the second microarchitectural state includes data transferred to the invalidated portion of the cache circuitry based on the speculative execution of the first instruction by the processor circuitry.

Example 44 may include elements of any of examples 42 or 43 where the means for transitioning the cache circuitry from the first microarchitectural state to the second microarchitectural state comprises: means for transitioning a flag bit associated with the data transferred to the invalidated portion of the cache circuitry to a first state indicative of data present in the cache circuitry that is associated with the speculatively executed first instruction; means for blocking access to the data transferred to the invalidated portion of the cache circuitry by a second instruction while the flag bit remains in the first state; means for transitioning the flag bit associated with the data transferred to the invalidated portion of the cache circuitry to a second state, the second state indicative of the successful speculative execution of the one or more instructions by the processor circuitry; and means for providing access to the data transferred to the invalidated portion of the cache circuitry by a second instruction while the flag bit remains in the first state.

Example 45 may include elements of any of examples 42 through 44 where the means for transitioning the cache circuitry from the first microarchitectural state to the second microarchitectural state comprises: means for storing data representative of the first microarchitectural state; and where the means for reverting the cache circuitry from the second microarchitectural state to the first microarchitectural state comprises: means for copying the stored data representative of the first microarchitectural state to the cache circuitry.

Example 46 may include elements of any of examples 42 through 45, and the system may additionally include: means for maintaining at least a first portion of the cache circuitry in a known state; where the means for transitioning the cache circuitry from the first microarchitectural state to the second microarchitectural state comprises: means for transitioning the first portion of the cache circuitry from the known state to the second microarchitectural state responsive to speculative execution of the first instruction by the processor circuitry, wherein the second microarchitectural state includes data transferred from system memory circuitry to the first portion of the cache circuitry based on the speculative execution of the first instruction by the processor circuitry.

Example 47 may include elements of any of examples 42 through 46 where the means for maintaining the cache circuitry in the second microarchitectural state responsive to a successful speculative execution of the first instruction by the processor circuitry comprises: means for copying the data transferred from the system memory circuitry from the first portion of the cache circuitry to a second portion of the cache circuitry; and means for reverting the first portion of the cache circuitry to the known state.

Example 48 may include elements of any of examples 42 through 47 where the means for reverting the cache circuitry from the second microarchitectural state to the first microarchitectural state responsive to an unsuccessful speculative execution of the first instruction by the processor circuitry comprises: means for flushing the data transferred from the system memory circuitry from the first portion of the cache circuitry; and means for reverting the first portion of the processor cache memory to the known state.

Example 49 may include elements of any of examples 42 through 48 where the means for transitioning the first portion of the cache circuitry from the known state to the second microarchitectural state responsive to speculative execution of the first instruction by the processor circuitry comprises: means for copying known data stored in the first portion of the cache circuitry to a second portion of the cache circuitry; and means for transferring data from system memory circuitry to the first portion of the cache circuitry based on the speculative execution of the first instruction by the processor circuitry.

Example 50 may include elements of any of examples 42 through 49 where the means for reverting the cache circuitry from the second microarchitectural state to the first microarchitectural state responsive to an unsuccessful speculative execution of the first instruction by the processor circuitry comprises: means for copying the known data from the second portion of the cache circuitry to the first portion of the cache circuitry; and means for invalidating the second portion of the cache circuitry.

Example 51 may include elements of any of examples 42 through 50 where the means for maintaining the cache circuitry in the second microarchitectural state responsive to the successful speculative execution of the first instruction by the processor circuitry comprises: means for invalidating the second portion of the cache circuitry.

Example 52 may include elements of any of examples 42 through 51 where the means for transitioning the first portion of the cache circuitry from the known state to the second microarchitectural state responsive to speculative execution of the first instruction by the processor circuitry comprises: means for evicting data from the first portion of the cache circuitry; and means for transferring data from the system memory circuitry to the first portion of the cache circuitry based on the speculative execution of the first instruction by the processor circuitry.

Example 53 may include elements of any of examples 42 through 52 where the means for reverting the cache circuitry from the second microarchitectural state to the first microarchitectural state responsive to the unsuccessful speculative execution of the first instruction by the processor circuitry comprises: means for invalidating the second portion of the cache circuitry.

Example 54 may include elements of any of examples 42 through 53 where the means for maintaining the cache circuitry in the second microarchitectural state responsive to the successful speculative execution of the first instruction by the processor circuitry comprises: means for evicting of data from a third portion of the cache circuitry.

According to example 55, there is provided a system to prevent side-channel attacks by maintaining consistency between architectural states, the system being arranged to perform the method of any of examples 29 through 41.

According to example 56, there is provided a chipset arranged to perform the method of any of examples 29 through 41.

According to example 57, there is provided at least one machine readable medium comprising a plurality of instructions that, in response to be being executed on a computing device, cause the computing device to carry out the method according to any of examples 29 through 41.

According to example 58, there is provided a device prevent side-channel attacks by maintaining consistency between architectural states, the device being arranged to perform the method of any of the examples 29 through 41.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A processor cache management system, comprising:
processor circuitry;
cache circuitry coupled to the processor circuitry;
memory management circuitry coupled to the processor cache;
a storage device containing machine-readable instructions that, when executed, cause the memory management circuitry to:
cause a transition in the cache circuitry from a first microarchitectural state to a second microarchitectural state responsive to speculative execution of a first instruction by the processor circuitry, wherein the cache circuitry in the first microarchitectural state includes a first set of data, and the cache circuitry in the second microarchitectural state includes the first set of data and second data transferred to cache circuitry based on the speculative execution of the first instruction by the processor circuitry;
cause a transition in the cache circuitry to a third microarchitectural state responsive to a successful speculative execution of the first instruction by the processor circuitry, wherein the cache circuitry in the third microarchitectural state includes the second data and a subset of the first data; and
cause the cache circuitry to revert from the second microarchitectural state to the first microarchitectural state responsive to an unsuccessful speculative execution of the first instruction by the processor circuitry.

2. The system of claim 1:
wherein the first microarchitectural state includes the cache circuitry in which at least a portion of the cache circuitry is in an invalidated state; and
wherein the second microarchitectural state includes data transferred to the invalidated portion of the cache circuitry based on the speculative execution of the first instruction by the processor circuitry.

3. The system of claim 2:
wherein the instructions that cause the memory management circuitry to cause a transition the cache circuitry from a first microarchitectural state to a second microarchitectural state responsive to speculative execution of the first instruction by the processor circuitry further cause the memory management circuitry to:
transition a flag bit associated with the data transferred to the invalidated portion of the cache circuitry to a first state indicative of data present in the cache circuitry that is associated with the speculatively executed first instruction;
wherein the machine-executable instructions further cause the memory management circuitry to block access to the data transferred to the invalidated portion of the cache circuitry by a second instruction while the flag bit remains in the first state; and
wherein the instructions that cause the memory management circuitry to cause the cache circuitry to transition to a third microarchitectural state responsive to a successful speculative execution of the first instruction by the processor circuitry further cause the memory management circuitry to:
transition the flag bit associated with the data transferred to the invalidated portion of the cache circuitry to a second state, the second state indicative of the successful speculative execution of the one or more instructions by the processor circuitry;
wherein the machine-executable instructions further cause the memory management circuitry to provide access to the data transferred to the invalidated portion of the cache circuitry by a second instruction while the flag bit remains in the first state.

4. The system of claim 3:
wherein the speculatively executed first instruction includes one or more instructions executed by a first core circuit included in the processor circuitry; and
wherein the second instruction includes one or more instructions executed by a second core circuit included in the processor circuitry.

5. The system of claim 3:
wherein the speculatively executed first instruction includes one or more instructions executed by a first hyperthread executed on the processor circuitry;
wherein the second instruction includes one or more instructions executed by a second hyperthread executed on the processor circuitry.

6. The system of claim 1:
wherein the machine-executable instructions that cause the memory management circuitry to cause a transition the cache circuitry from a first microarchitectural state to a second microarchitectural state responsive to speculative execution of a first instruction by the processor circuitry further cause the memory management circuitry to:
cause a storage of data representative of the first microarchitectural state; and
wherein the machine-executable instructions that cause the memory management circuitry to cause the cache circuitry to revert from the second microarchitectural state to the first microarchitectural state responsive to an unsuccessful speculative execution of the first instruction by the processor circuitry further cause the memory management circuitry to:
copy the stored data representative of the first microarchitectural state to the cache circuitry.

7. The system of claim 1:
wherein the machine-executable instructions further cause the memory management circuitry to maintain at least a first portion of the cache circuitry in a known state;
wherein the machine-executable instructions that cause the memory management circuitry to cause the transition of the cache circuitry from the first microarchitectural state to the second microarchitectural state responsive to the speculative execution of the first instruction by the processor circuitry further cause the memory management circuitry to:
cause the transition of the first portion of the cache circuitry from the known state to the second microarchitectural state responsive to speculative execution of the first instruction by the processor circuitry, wherein the second microarchitectural state includes data transferred from system memory circuitry to the first portion of the cache circuitry based on the speculative execution of the first instruction by the processor circuitry.

8. The system of claim 7 wherein the machine-executable instructions that cause the memory management circuitry to transition the cache circuitry to the third microarchitectural state responsive to a successful speculative execution of the first instruction by the processor circuitry further cause the memory management circuitry to:
cause a copy of the data transferred from the system memory circuitry from the first portion of the cache circuitry to a second portion of the processor cache circuitry; and
cause the first portion of the processor cache memory to revert back to the first known state.

9. The system of claim 8 wherein the machine-executable instructions that cause the memory management circuitry to cause the cache circuitry to revert from the second microarchitectural state to the first microarchitectural state responsive to an unsuccessful speculative execution of the first instruction by the processor circuitry further cause the memory management circuitry to:
cause a flush of the data transferred from the system memory circuitry from the first portion of the cache circuitry; and
cause the first portion of the processor cache memory to revert back to the first known state.

10. The system of claim 7:
wherein the first known state includes known data stored in the first portion of the processor cache memory;
wherein the instructions that cause the memory management circuitry to cause the transition of the first portion of the cache circuitry from the known state to the second microarchitectural state responsive to speculative execution of the first instruction by the processor circuitry further cause the memory management circuitry to:
copy the known data stored in the first portion of the cache circuitry to a second portion of the cache circuitry; and
transfer data from system memory circuitry to the first portion of the cache circuitry based on the speculative execution of the first instruction by the processor circuitry.

11. The system of claim 10 wherein the instructions that cause the memory management circuitry to cause the cache circuitry to revert from the second microarchitectural state to the first microarchitectural state responsive to an unsuccessful speculative execution of the first instruction by the processor circuitry further cause the memory management circuitry to:
copy the known data from the second portion of the cache circuitry to the first portion of the cache circuitry; and
invalidate the second portion of the cache circuitry.

12. The system of claim 11 wherein the instructions that cause the memory management circuitry to transition the cache circuitry to the third microarchitectural state responsive to a successful speculative execution of the first instruction by the processor circuitry further cause the cache circuitry to:
invalidate the second portion of the cache circuitry.

13. The system of claim 7:
wherein the instructions that cause the memory management circuitry to cause the transition of the first portion of the cache circuitry from the known state to the second microarchitectural state responsive to speculative execution of the first instruction by the processor circuitry further cause the memory management circuitry to:
cause an eviction of data from the first portion of the cache circuitry; and
transfer data from system memory circuitry to the first portion of the cache circuitry based on the speculative execution of the first instruction by the processor circuitry.

14. The system of claim 13 wherein the instructions that cause the memory management circuitry to cause the cache circuitry to revert from the second microarchitectural state to the first microarchitectural state responsive to an unsuccessful speculative execution of the first instruction by the processor circuitry further cause the memory management circuitry to:
invalidate the second portion of the cache circuitry.

15. The system of claim 14 wherein the instructions that cause the memory management circuitry to transition the cache circuitry to the third microarchitectural state responsive to a successful speculative execution of the first instruction by the processor circuitry further cause the cache circuitry to:
   cause an eviction of data from a third portion of the cache circuitry.

16. A non-transitory, machine-readable, storage device comprising instructions that, when executed by memory management circuitry, cause the memory management circuitry to:
   cause a transition of cache circuitry from a first microarchitectural state to a second microarchitectural state responsive to speculative execution of a first instruction by processor circuitry, wherein the cache circuitry in the first microarchitectural state includes a first set of data, and the cache circuitry in the second microarchitectural state includes the first set of data and second data transferred to cache circuitry based on the speculative execution of the first instruction by the processor circuitry;
   cause the cache circuitry cause to transition to a third microarchitectural state responsive to a successful speculative execution of the first instruction by the processor circuitry, wherein the cache circuitry in the third microarchitectural state includes the second data and a subset of the first data; and
   cause the cache circuitry to revert from the second microarchitectural state to the first microarchitectural state responsive to an unsuccessful speculative execution of the first instruction by the processor circuitry.

17. The non-transitory machine-readable storage device of claim 16:
   wherein the first microarchitectural state includes the cache circuitry in which at least a portion of the cache circuitry is in an invalidated state; and
   wherein the second microarchitectural state includes data transferred to the invalidated portion of the cache circuitry based on the speculative execution of the first instruction by the processor circuitry.

18. The non-transitory machine-readable storage device of claim 17 wherein the machine-readable instructions that cause the memory management circuitry to cause a transition the cache circuitry from a first microarchitectural state to a second microarchitectural state further cause the memory management circuitry to:
   transition a flag bit associated with the data transferred to the invalidated portion of the cache circuitry to a first state indicative of data present in the cache circuitry that is associated with the speculatively executed first instruction;
   wherein the machine-readable instructions further cause the memory management circuitry to block access to the data transferred to the invalidated portion of the cache circuitry by a second instruction while the flag bit remains in the first state; and
   wherein the instructions that cause the memory management circuitry to transition the cache circuitry to the third microarchitectural state responsive to a successful speculative execution of the first instruction by the processor circuitry further cause the memory management circuitry to:
      transition the flag bit associated with the data transferred to the invalidated portion of the cache circuitry to a second state, the second state indicative of the successful speculative execution of the one or more instructions by the processor circuitry;
   wherein the machine-readable instructions further cause the memory management circuitry to provide access to the data transferred to the invalidated portion of the cache circuitry by a second instruction while the flag bit remains in the first state.

19. The non-transitory machine-readable storage device of claim 16 wherein:
   the machine-readable instructions that cause the memory management circuitry to cause a transition the cache circuitry from a first microarchitectural state to a second microarchitectural state further cause the memory management circuitry to:
      cause a storage of data representative of the first microarchitectural state; and
   wherein the machine-executable instructions that cause the memory management circuitry to cause the cache circuitry to revert from the second microarchitectural state to the first microarchitectural state responsive to an unsuccessful speculative execution of the first instruction by the processor circuitry further cause the memory management circuitry to:
      copy the stored data representative of the first microarchitectural state to the cache circuitry.

20. The non-transitory machine-readable storage device of claim 16:
   wherein the machine-readable instructions further include machine-readable instructions that cause the memory management circuitry to maintain at least a first portion of the cache circuitry in a known state;
   wherein the machine-executable instructions that cause the memory management circuitry to cause the transition of the cache circuitry from the first microarchitectural state to the second microarchitectural state responsive to the speculative execution of the first instruction by the processor circuitry further cause the memory management circuitry to:
      cause the transition of the first portion of the cache circuitry from the known state to the second microarchitectural state responsive to speculative execution of the first instruction by the processor circuitry, wherein the second microarchitectural state includes data transferred from system memory circuitry to the first portion of the cache circuitry based on the speculative execution of the first instruction by the processor circuitry.

21. The non-transitory machine-readable storage device of claim 20 wherein the machine-readable instructions that cause the memory management circuitry to transition the cache circuitry to the third microarchitectural state responsive to a successful speculative execution of the first instruction by the processor circuitry further cause the memory management circuitry to:
   cause a copy of the data transferred from the system memory circuitry from the first portion of the cache circuitry to a second portion of the processor cache circuitry; and
   cause the first portion of the processor cache memory to revert back to the known state.

22. The non-transitory machine-readable storage device of claim 21 wherein the machine-readable instructions that cause the memory management circuitry to cause the cache circuitry to revert from the second microarchitectural state to the first microarchitectural state responsive to an unsuccessful speculative execution of the first instruction by the processor circuitry further cause the memory management circuitry to:

cause a flush of the data transferred from the system memory circuitry from the first portion of the cache circuitry; and cause the first portion of the processor cache memory to revert back to the first known state.

23. The non-transitory machine-readable storage device of claim 20:

wherein the known state includes known data stored in the first portion of the processor cache memory;

wherein the instructions that cause the memory management circuitry to cause the transition of the first portion of the cache circuitry from the known state to the second microarchitectural state responsive to speculative execution of the first instruction by the processor circuitry further cause the memory management circuitry to:

copy the known data stored in the first portion of the cache circuitry to a second portion of the cache circuitry; and transfer data from system memory circuitry to the first portion of the cache circuitry based on the speculative execution of the first instruction by the processor circuitry.

24. The non-transitory machine-readable storage device of claim 23:

wherein the instructions that cause the memory management circuitry to cause the cache circuitry to revert from the second microarchitectural state to the first microarchitectural state responsive to an unsuccessful speculative execution of the first instruction by the processor circuitry further cause the memory management circuitry to:

copy the known data from the second portion of the cache circuitry to the first portion of the cache circuitry; and invalidate the second portion of the cache circuitry.

25. The non-transitory machine-readable storage device of claim 24:

wherein the instructions that cause the memory management circuitry to transition the cache circuitry to the third microarchitectural state responsive to a successful speculative execution of the first instruction by the processor circuitry further cause the cache circuitry to: invalidate the second portion of the cache circuitry.

26. The non-transitory machine-readable storage device of claim 20:

wherein the instructions that cause the memory management circuitry to cause the transition of the first portion of the cache circuitry from the known state to the second microarchitectural state responsive to speculative execution of the first instruction by the processor circuitry further cause the memory management circuitry to:

cause an eviction of data from the first portion of the cache circuitry; and transfer data from system memory circuitry to the first portion of the cache circuitry based on the speculative execution of the first instruction by the processor circuitry.

27. The non-transitory machine-readable storage device of claim 26:

wherein the instructions that cause the memory management circuitry to cause the cache circuitry to revert from the second microarchitectural state to the first microarchitectural state responsive to an unsuccessful speculative execution of the first instruction by the processor circuitry further cause the memory management circuitry to:

invalidate the second portion of the cache circuitry.

28. The non-transitory machine-readable storage device of claim 27:

wherein the instructions that cause the memory management circuitry to transition the cache circuitry to the third microarchitectural state responsive to a successful speculative execution of the first instruction by the processor circuitry further cause the cache circuitry to:

cause an eviction of data from a third portion of the cache circuitry.

29. A system for protecting against side-channel attacks, comprising:

means for transitioning cache circuitry from a first microarchitectural state to a second microarchitectural state responsive to speculative execution of a first instruction by processor circuitry, wherein the cache circuitry in the first microarchitectural state includes a first set of data, and the cache circuitry in the second microarchitectural state includes the first set of data and second data transferred to cache circuitry based on the speculative execution of the first instruction by the processor circuitry;

means for transitioning the cache circuitry to a third microarchitectural state responsive to a successful speculative execution of the first instruction by the processor circuitry, wherein the cache circuitry in the third microarchitectural state includes the second data and a subset of the first data; and means for reverting the cache circuitry from the second microarchitectural state to the first microarchitectural state responsive to an unsuccessful speculative execution of the first instruction by the processor circuitry.

* * * * *